(12) United States Patent
Honda

(10) Patent No.: US 6,341,253 B1
(45) Date of Patent: Jan. 22, 2002

(54) ENGINE CONTROL APPARATUS WITH CYLINDER DISCRIMINATION FUNCTION

(75) Inventor: Takayoshi Honda, Kariya (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/665,693

(22) Filed: Sep. 20, 2000

(30) Foreign Application Priority Data

Sep. 24, 1999 (JP) ............................................ 11-270925
Feb. 3, 2000 (JP) ............................................ 12-026405

(51) Int. Cl.$^7$ .............................. F02P 5/15; F02P 7/067; G01B 7/30
(52) U.S. Cl. .............. 701/102; 123/406.62; 123/406.63; 123/643; 123/476; 73/116; 324/207.25
(58) Field of Search .................................. 701/101, 102, 701/103, 104, 105, 110; 123/406.58, 406.6, 406.61, 406.62, 406.63, 612, 617, 476, 479, 643; 73/116; 324/207.25

(56) References Cited

U.S. PATENT DOCUMENTS

| | | | |
|---|---|---|---|
| 4,649,881 A | * 3/1987 | Long | 123/406.63 |
| 4,972,095 A | 11/1990 | Oka et al. | 327/543 |
| 5,182,943 A | 2/1993 | Fukui et al. | 73/116 |
| 5,309,757 A | * 5/1994 | Hashimoto et al. | 73/116 |
| 5,329,904 A | 7/1994 | Kokubo et al. | 123/406.53 |
| 5,584,274 A | * 12/1996 | Fukui et al. | 123/479 |
| 5,604,304 A | 2/1997 | Kokubo et al. | 73/117.3 |
| 5,630,396 A | * 5/1997 | Fukui et al. | 123/406.62 |
| 5,632,246 A | * 5/1997 | Fukui et al. | 123/617 |
| 5,637,995 A | 6/1997 | Izawa et al. | 324/174 |
| 5,671,714 A | * 9/1997 | Fukui et al. | 123/406.62 |
| 6,020,736 A | 2/2000 | Aoyama et al. | 324/207.21 |

FOREIGN PATENT DOCUMENTS

| | | |
|---|---|---|
| JP | 60240875 | 11/1985 |
| JP | U-62-45359 | 3/1987 |
| JP | 6-213058 | 8/1994 |

* cited by examiner

Primary Examiner—Willis R. Wolfe
(74) Attorney, Agent, or Firm—Nixon & Vanderhye P.C.

(57) ABSTRACT

An engine control apparatus generates a 30° CA signal which rises per 30° CA rotation based on a rotational signal from a crank angle sensor and counts up a value CNT of a crank counter by the 30° CA signal. It also reads the level of a cylinder identification signal from a cam angle sensor every time when a reference position signal within the rotation signal is detected. It initializes the count value to 20 when the read level is low and to 8 when the read level is high. Although the apparatus carries out the cylinder discrimination based on the count value, it is also arranged so as not to initialize the count value when the previously read level is the same with the read level of this time. Thus, the cylinders can be identified correctly even if an abnormality occurs in a sensor for outputting a cylinder identification signal or in its wire.

7 Claims, 25 Drawing Sheets

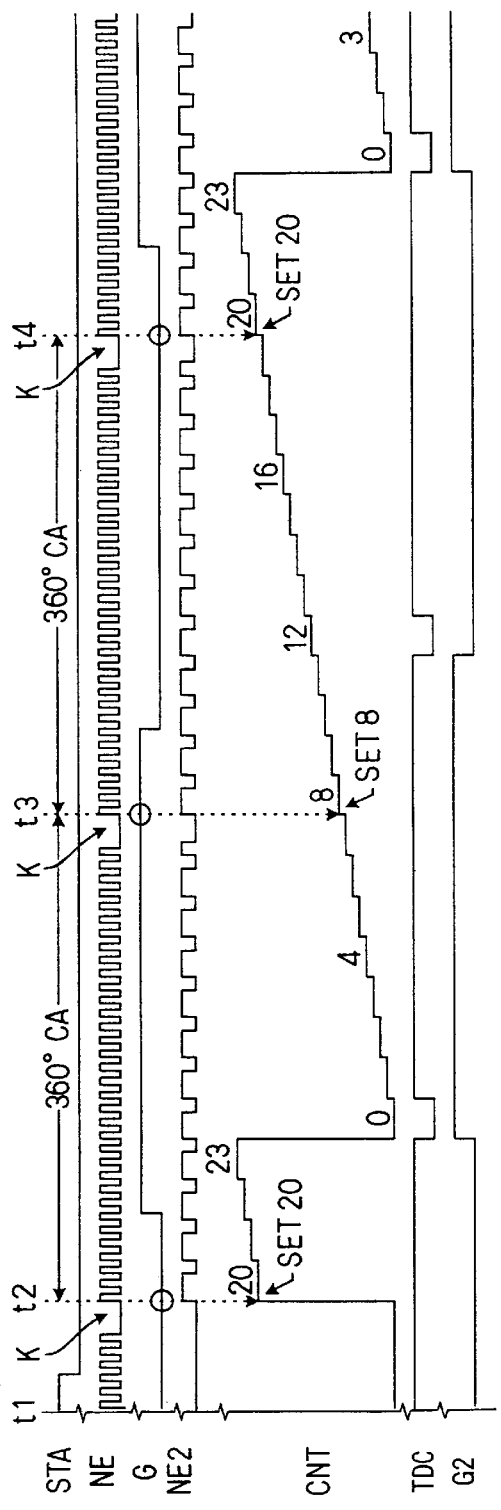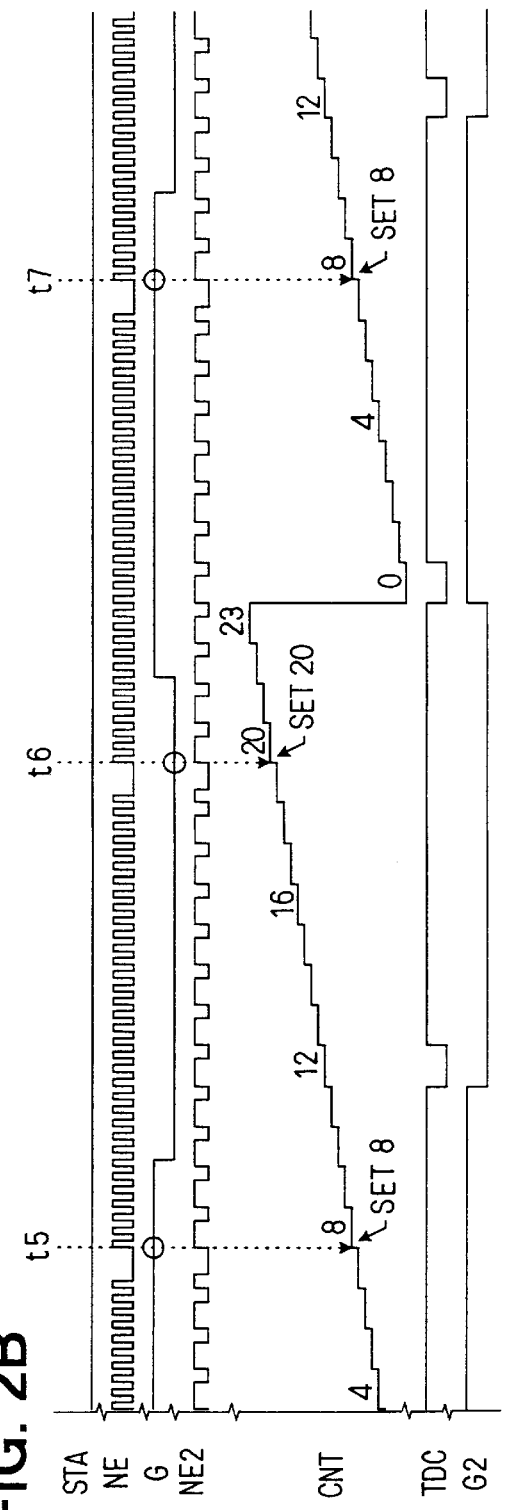

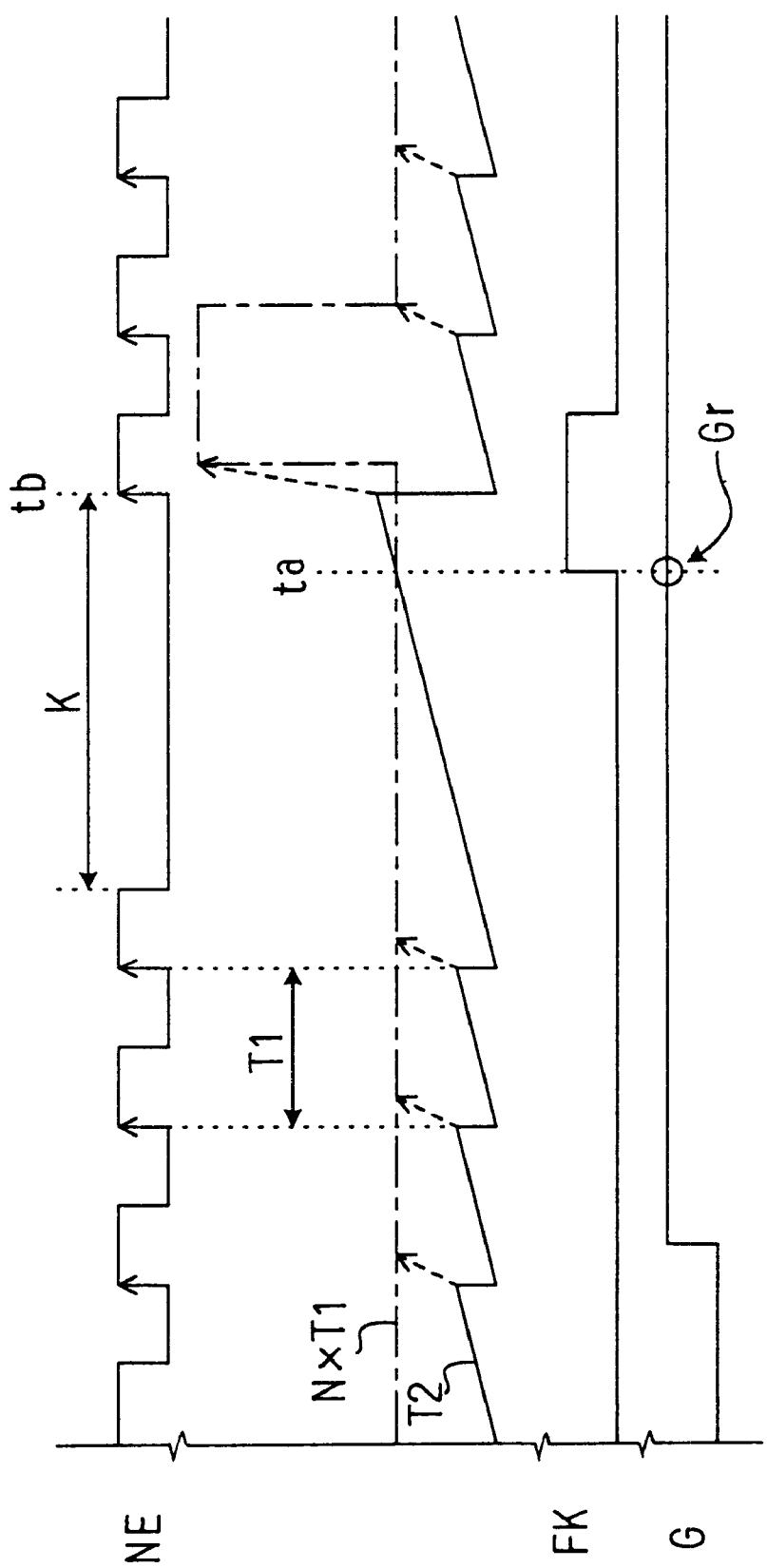

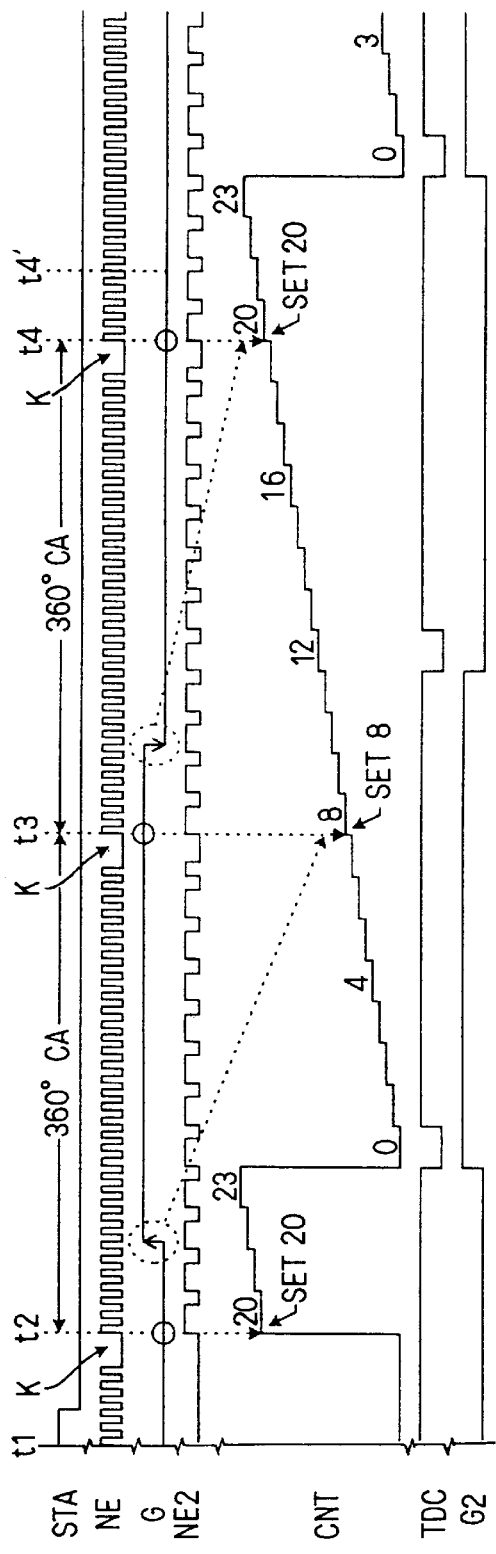
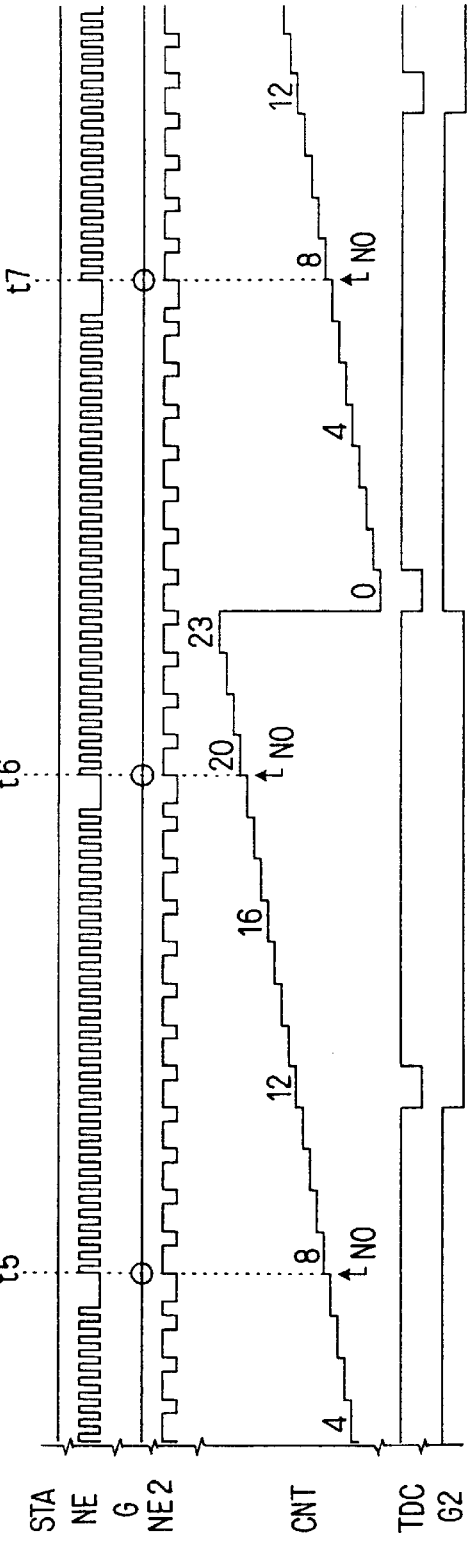
FIG. 10A
FIG. 10B

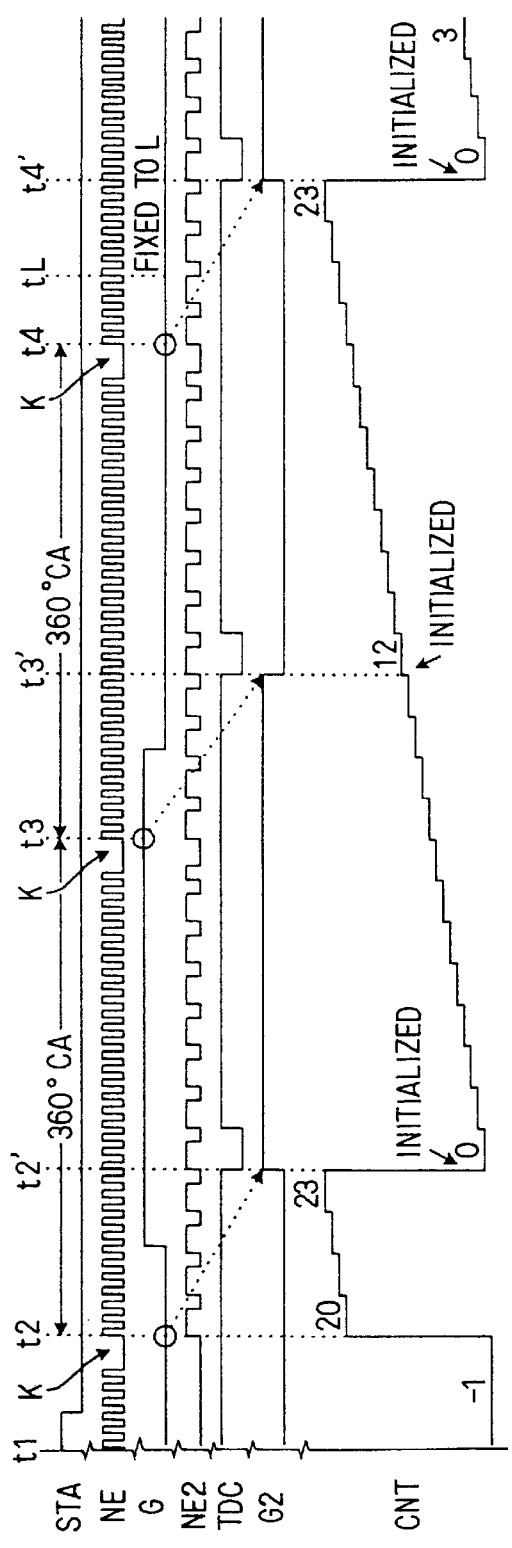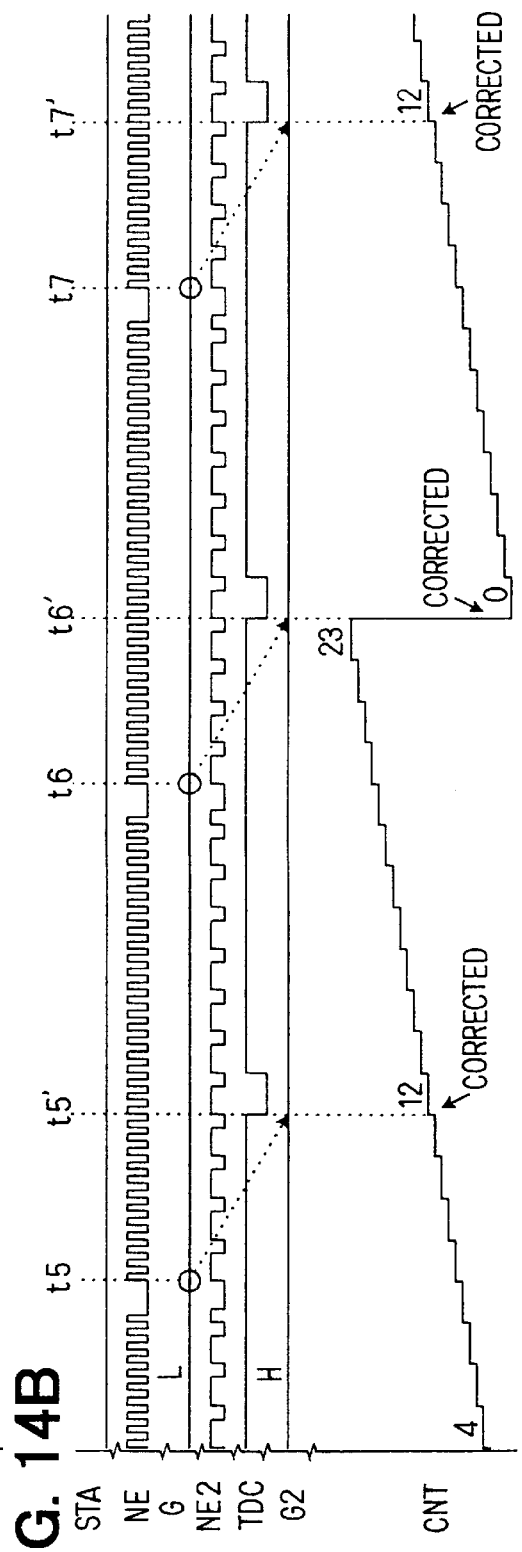

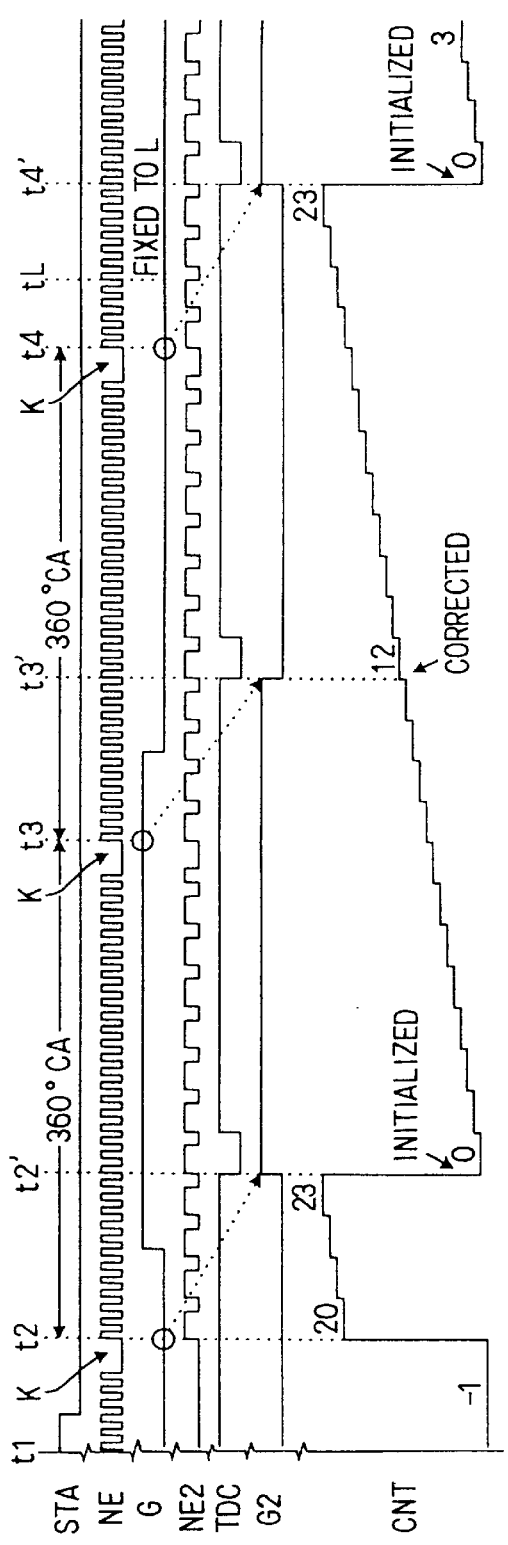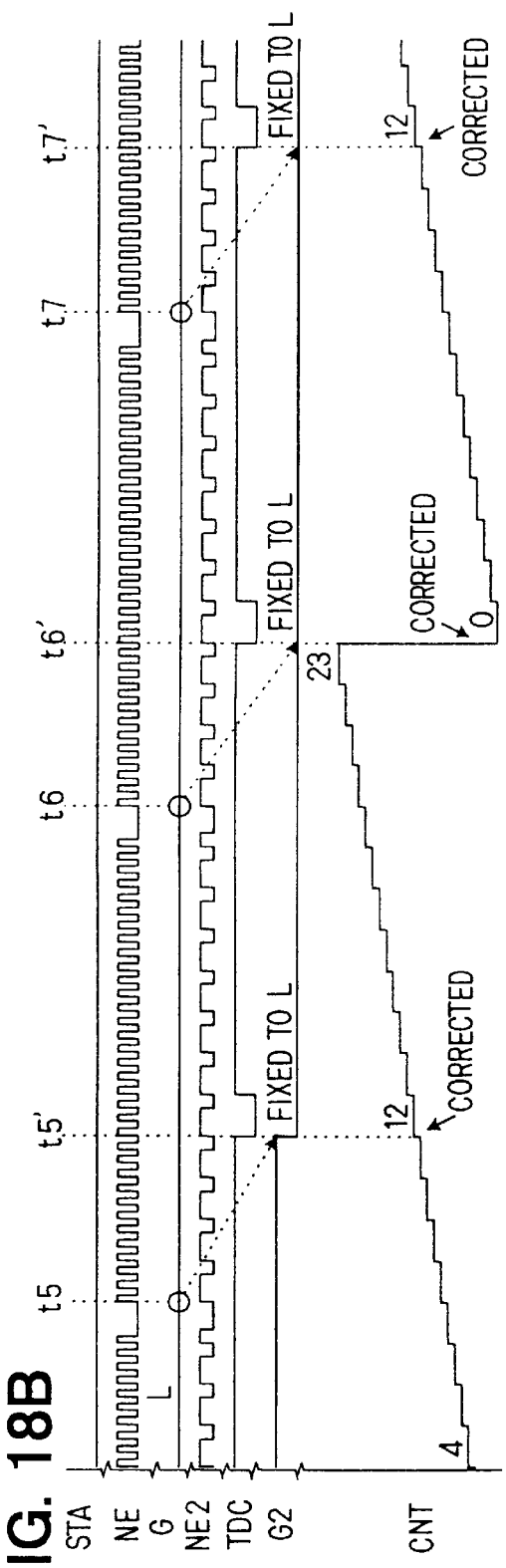

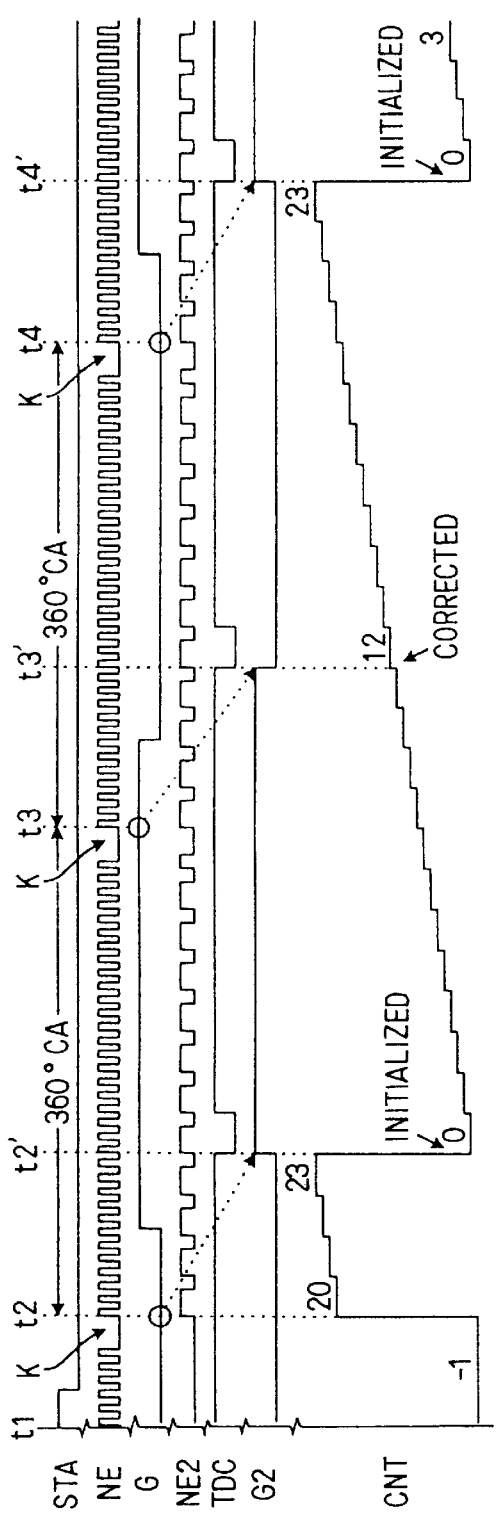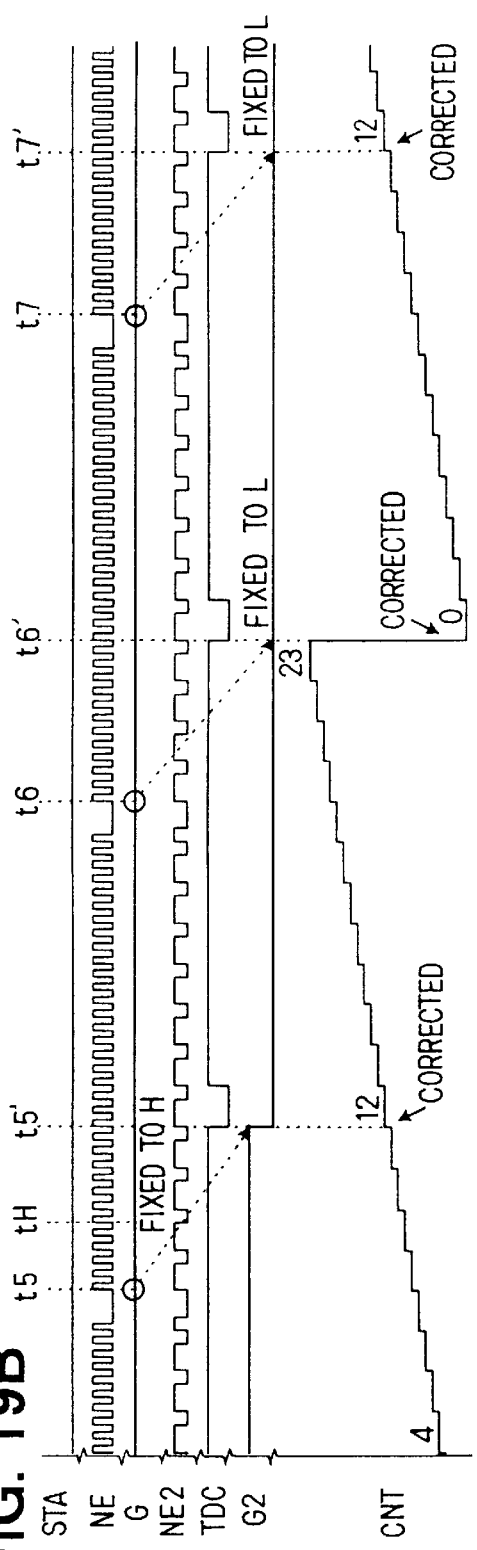

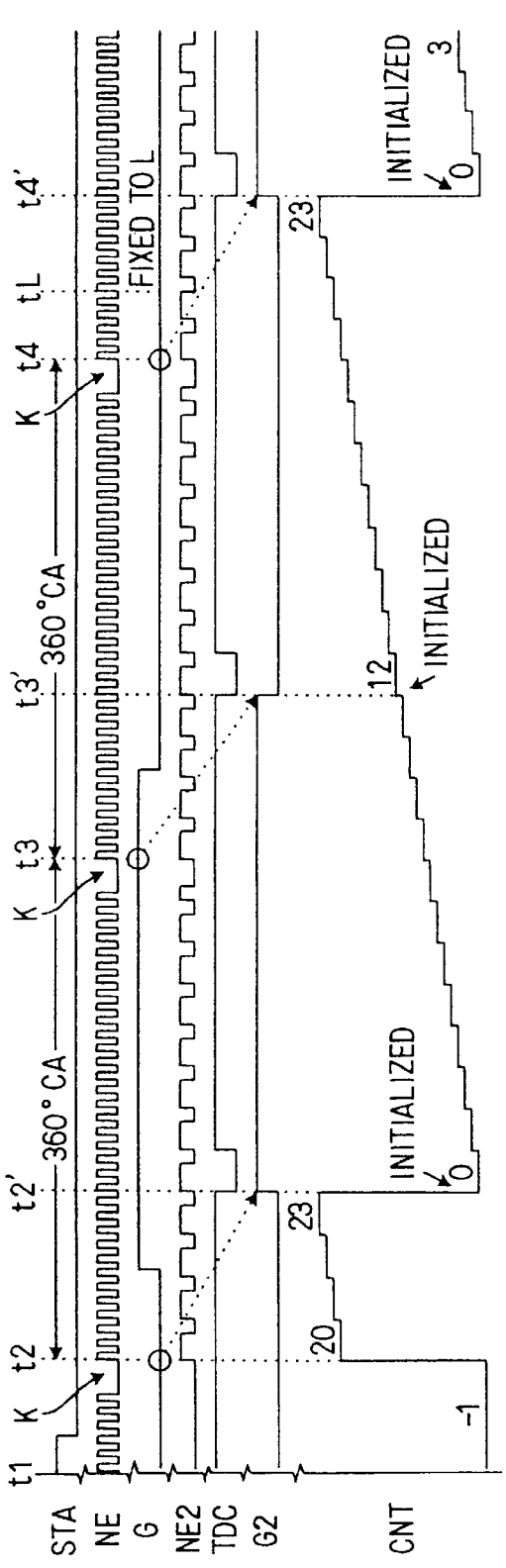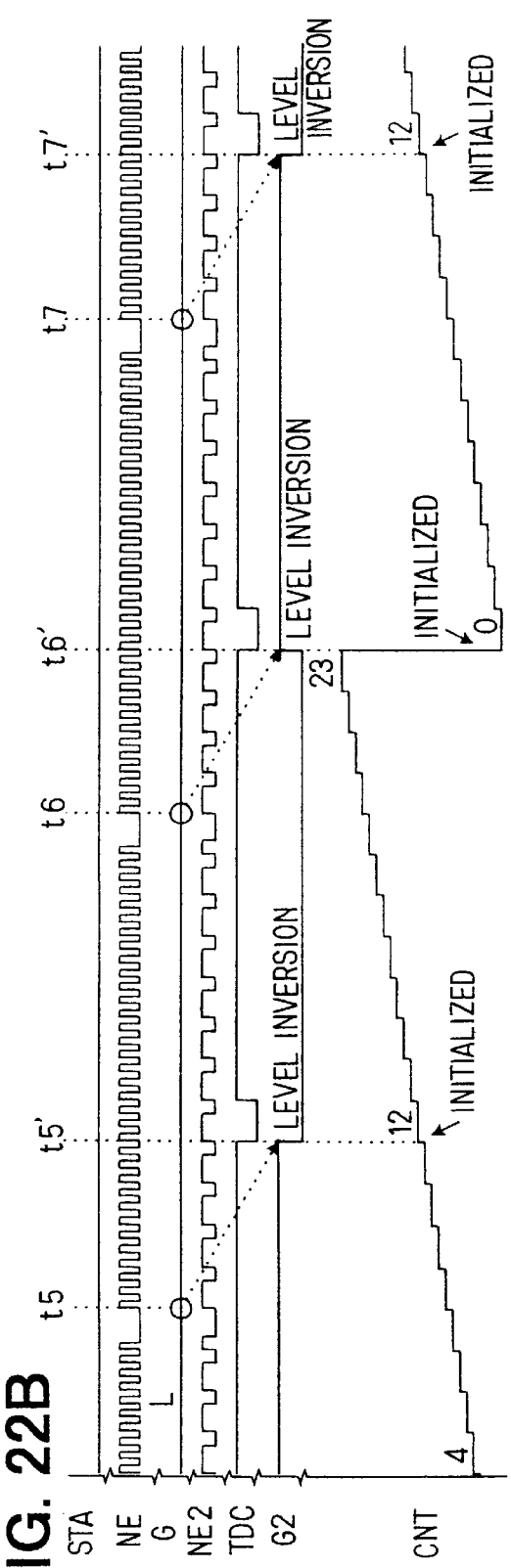

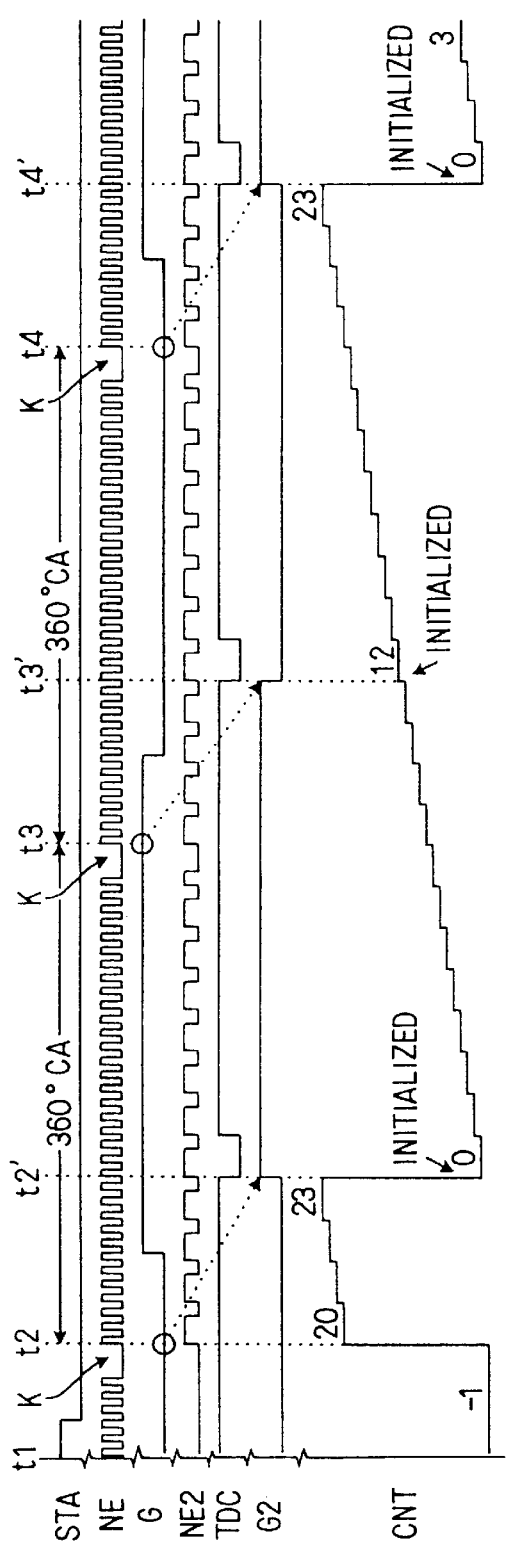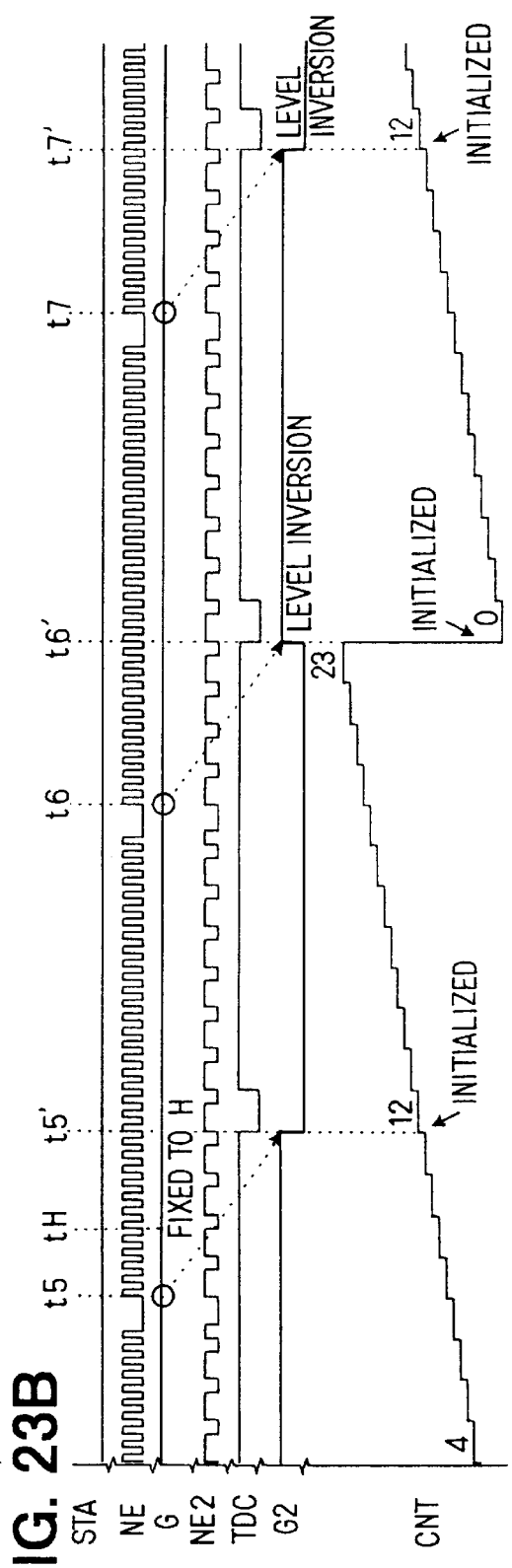

ENGINE CONTROL APPARATUS WITH CYLINDER DISCRIMINATION FUNCTION

CROSS REFERENCE TO RELATED APPLICATION

This application relates to and incorporates herein by reference Japanese Patent Application No. 11-270925 filed Sep. 24, 2000 and 2000-26405 filed Feb. 3, 2000.

BACKGROUND OF THE INVENTION

1. Field of the Invention

The present invention relates to an engine control apparatus for controlling a four-cycle engine and more specifically to discrimination of cylinders of the engine.

2. Related Art

An engine control apparatus has a crank angle sensor which outputs a pulse signal every time when an engine crankshaft rotates by a predetermined angle and outputs a reference position signal, instead of the pulse signal, when the rotational position of the crankshaft comes to preset reference position. It also has a cam angle sensor which outputs a cylinder identification signal whose logical level changes to high level and low level corresponding to rotational position of the engine camshaft which rotates with a rate of 1/2 to the rotation of the crankshaft. The engine control apparatus discriminates cylinders based on the logical level of the cylinder identification signal at timing when the reference position signal is outputted from the crank angle sensor (JP-A-6-213058, for example).

However, in this engine control apparatus, it is unable to discriminate the cylinders normally any longer when the logical level of a cylinder identification signal G does not change (when it is fixed) when an abnormality occurs in a wire from the cam angle sensor to a signal processing circuit of the engine control apparatus or in the cam angle sensor itself because the value of the crank counter is initialized only to either one of 8 and 20 per every 360° CA (crankshaft angle).

SUMMARY OF THE INVENTION

It is an object of the present invention to enable correct discrimination of cylinders even when an abnormality occurs in a sensor outputting the cylinder identification signal or in its wire.

According to the present invention, a reference position signal is generated at a predetermined reference position of a crankshaft, rotation signals are generated at every predetermined rotation of the crankshaft, and a logical signal is generated in response to a rotation of a shaft rotated at a rate of 1/2 of rotation of the crankshaft so that the logical signal changes a logical level thereof alternately at timing of the reference position signal. The logical level is read in response to the reference position signal. Accumulated angle of rotation of the crankshaft during two rotations of the crankshaft is counted using the rotation signals. The count is initialized to a first value and a second value when the output level read is high and low, respectively.

The initializing operation is inhibited when the logical level read this time coincides with the logical level read previously. Alternatively, it is inhibited when the logical level of the logical signal has not been reversed even once by checking whether the logical level has been reversed during a period from when the logical level has been read previously till when it is read this time. The initializing operation is enabled when it is determined that the logical level of the logical signal read this time s changed from the logical level read previously. The output level of the logical signal is changed to the one of high and low opposite from the other of high and low when it is discriminated that the level has not changed. Alternatively, the output level of the logical signal is changed to a logical level opposite from the logical level previously read when it is discriminated that the level has not changed.

BRIEF DESCRIPTION OF THE DRAWINGS

Other objects, features and advantages of the present invention will become more apparent from the following detailed description made with reference to the accompanying drawings. In the drawings:

FIGS. 2A and 2B are time charts showing operations of discriminating cylinders normally executed according to the first embodiment;

FIG. 3 is a time chart showing operations of a missing tooth detecting circuit and a level reading circuit of the first embodiment;

FIGS. 10A and 10B are time charts showing the operations and effects of the second embodiment;

FIGS. 14A and 14B are time charts showing the operation of the third embodiment when a cylinder identification signal G from a cam angle sensor is fixed to low level;

FIGS. 18A and 18B are time charts showing the operation of the fourth embodiment when the cylinder identification signal G from the cam angle sensor is fixed to low level;

FIGS. 19A and 19B are time charts showing the operation of the fourth embodiment when the cylinder identification signal G from the cam angle sensor is fixed to high level;

FIGS. 22A and 22B are time charts showing the operation of the fifth embodiment when the cylinder identification signal G from the cam angle sensor is fixed to low level;

FIGS. 23A and 23B are time charts showing the operation of the fifth embodiment when the cylinder identification signal G from the cam angle sensor is fixed to high level;

DETAILED DESCRIPTION OF THE PREFERRED EMBODIMENTS (First Embodiment)

Figure 1:
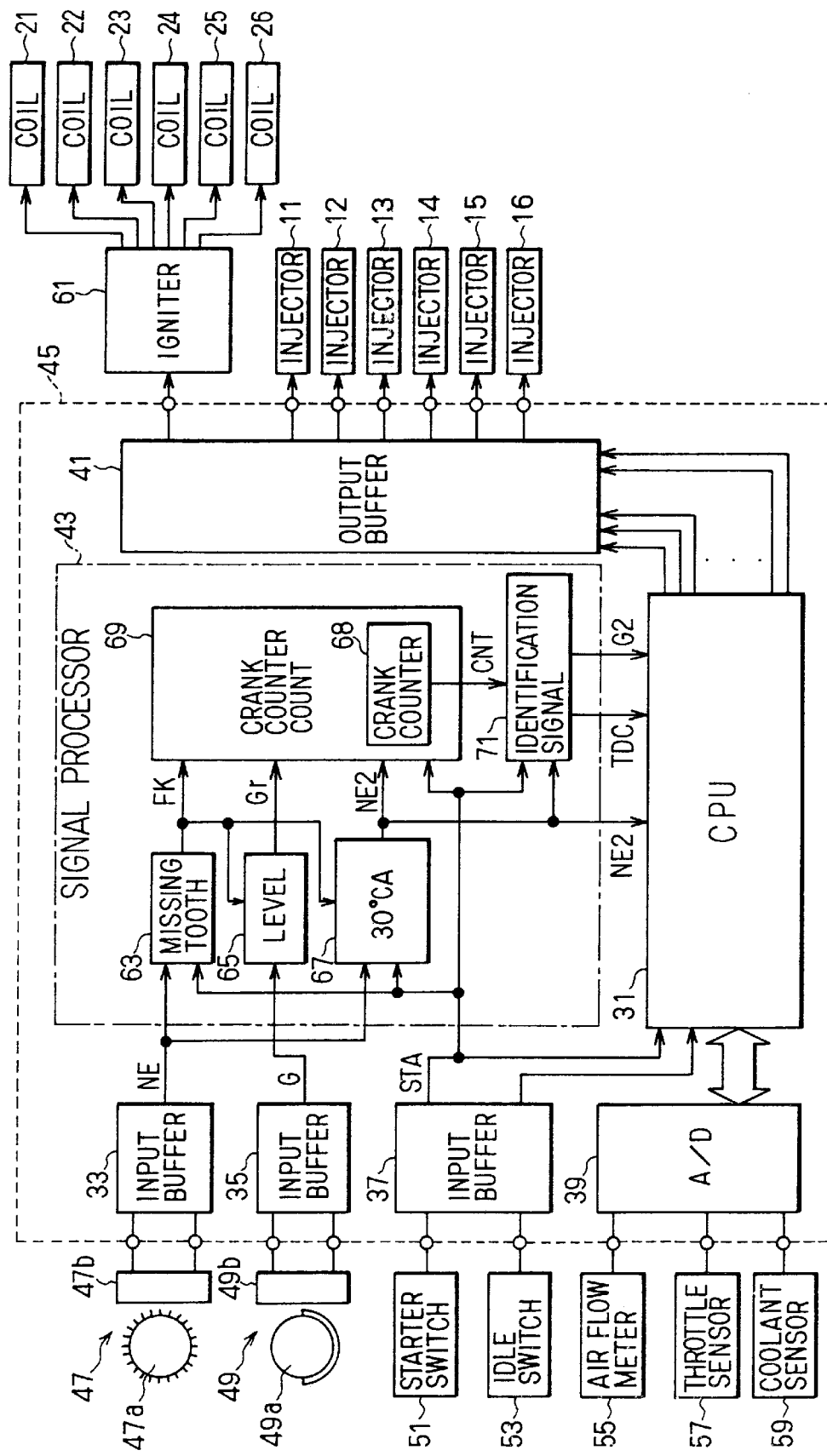
FIG. 1 is a block diagram illustrating the structure of an engine control apparatus according to a first embodiment of the invention.

Referring first to FIG. 1, it is noted that an engine control apparatus controls a V-type 6-cylinder four-cycle engine (not shown) for example and has six fuel injection valves 11 through 16 and six ignition coils 21 through 26.

The engine control apparatus of the first embodiment is constructed with an electronic control unit (ECU) 45 which comprises a microcomputer (CPU) 31, input buffers 33, 35 and 39 An A/D converter 39, an output buffer 41 and a signal processing circuit 43.

A rotation signal NE (n NE signal) from a crank angle sensor 47 mounted on the engine is inputted to the signal processing circuit 43 via the input buffer 33 and a cylinder identification signal G (G signal) from a cam angle sensor 49 mounted to the engine is inputted to the signal processing circuit 43 via the input buffer 35. Here, the crank angle sensor 47 comprises a rotor 49A fixed to a crankshaft (not shown) of the engine and a photoelectric or Hall IC type signal output section 49B which is provided to face the outer periphery of the rotor 49A and outputs pulse signals by detecting teeth created at intervals of 10° CA around the rotor 49A. A missing tooth section where two tooth are eliminated is provided at the outer periphery of the rotor 49A.

Figure 5:
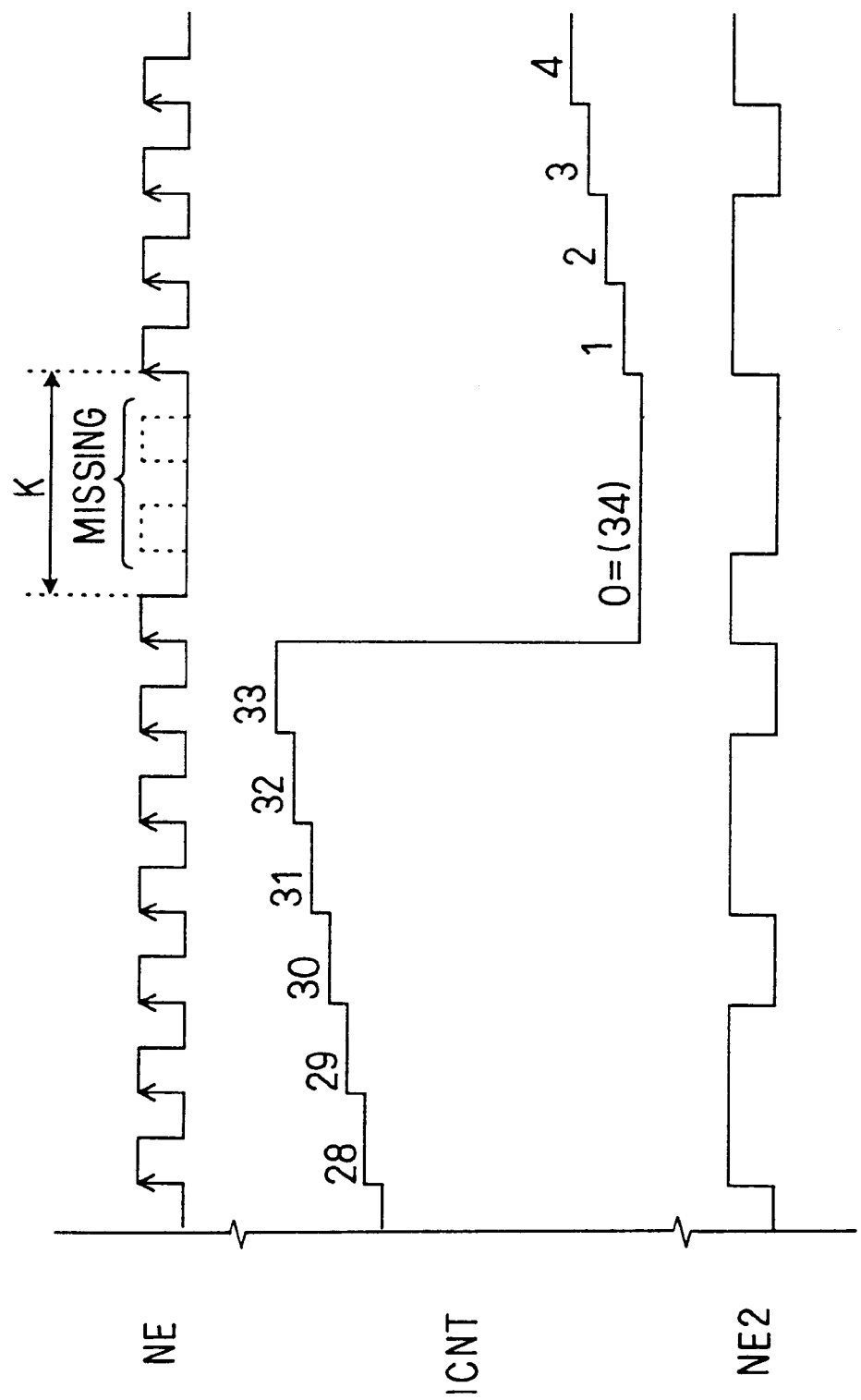
FIG. 5 is a flow chart illustrating operations of the 30° CA signal processing circuit in the first embodiment.

The NE signal inputted to the signal processing circuit 43 from the crank angle sensor 47 via the input buffer 33 changes pulsewise from low level ->high level ->low level every time when the crankshaft rotates by 10° CA (per 10° CA) and its leading edge interval is prolonged by three times when the rotational position of the crankshaft comes to one reference position corresponding to the tooth missing section of the rotor 49A, i.e., the position where the missing tooth section of the rotor 49A faces the signal output section 49B, as shown in FIGS. 2A and 2B. The part which changes pulsewise per 10° CA becomes the pulse signal and the period where the leading edge interval is prolonged by three times, i.e., the period where the pulse signal is missing twice, and which occurs per every 360° CA becomes a reference position signal K (FIGS. 3 and 5).

The cam angle sensor 49 comprises a rotor 49a which is fixed to an engine camshaft (not shown) which rotates with a rate of 1/2 to the rotation of the crankshaft and a magneto-resistance element type signal output section 49b which outputs a G signal whose logical level is reversed every time when the rotor 49a rotates by 1/2, i.e., per 360° CA, corresponding to the rotation of the rotor 49a. The logical level of the G signal inputted from the cam angle sensor 49 to the signal processing circuit 43 via the input buffer 35 is reversed once during the period during which the pulse signals are outputted from the crank angle sensor 49As shown in FIGS. 2A and 2B. The logical level differs alternately per each timing when the reference position signal K is outputted from the crank angle sensor 47.

Various switch signals indicating the operation state of the engine such as a starter signal STA which turns to high level when a starter switch 51 for starting the engine is turned on and a signal from an idle switch 53 which is turned on when an accelerator pedal is fully released for idle operation are inputted to the CPU 31 within the ECU 45 via the input buffer 37. Signals from various sensors such as an airflow meter 55 for detecting an intake air amount, a throttle sensor 57 for detecting a throttle control amount and a coolant temperature sensor 59 for detecting temperature of coolant are also inputted to the CPU 31 via the A/D converter 39. The starter signal STA is also inputted to the signal processing circuit 43 via the input buffer 39 Based on the starter signal STA, NE signal and G signal, the signal processing circuit 43 generates a 30° CA signal NE2 which rises per 30° CA and cylinder discriminating first signal TDC (top dead center position of a cylinder) and second signal G2 by the procedure described later and outputs them to the CPU 31.

The CPU 31 discriminates the cylinders based on the signals NE2, TDC and G2 from the signal processing circuit 43, and calculates the optimum engine ignition timing, fuel injection timing and injection amount based on the result of discrimination, the various switch signals and the signals from the various sensors described above. The CPU 31 thus drives the fuel injection valves 11 through 16 of the respective cylinders via the output buffer 41 and drives an igniter 61 to energize the ignition coils 21 through 26 of corresponding cylinders based on the result of calculation.

The signal processing circuit 43 comprises a missing tooth detecting circuit 63 for detecting that the reference position signal K is outputted from the crank angle sensor 49A level reading circuit 65 for reading the logical level of the G signal from the cam angle sensor 49 when the missing tooth detecting circuit 63 detects that the reference position signal K is generated, a 30° CA signal generating circuit 67 for generating the 30° CA signal NE2 from the pulse signals within the NE signals outputted from the crank angle sensor 49A crank counter counting circuit 69 for updating a value CNT (which corresponds to a count value) of a crank counter 68 which indicates an accumulated rotational angle of two rotations of the crankshaft as resolution of 30° every time when the 30° CA signal NE2 rises, i.e., every time when it is detected that the crankshaft has rotated by 30° based on the NE signal, and a identification signal generating circuit 71 for generating the first signal TDC and the second signal G2 for enabling the CPU 31 to discriminate the cylinders based on the value CNT of the crank counter 68.

It is noted that because the reference position signal K is outputted from the crank angle sensor 49As described above when the missing tooth section of the rotor 49A comes to the position facing the signal output section 49B as the crankshaft rotates, the detection of the reference position signal K is referred to also as "detection of missing tooth" in the present embodiment.

When the starter signal STA turns to high level, i.e., when the starter switch is turned on, the missing tooth detecting circuit 63 detects the reference position signal K within the NE signals thereafter by the procedure shown in FIG. 3.

That is, the missing tooth detecting circuit 63 resets clock timer value T2 to zero every time when the NE signal rises from low level to high level and measures the latest rise interval T1 of the NE signal from the timer value T2 just before the reset as shown in FIG. 3. Then, it sets reference position signal detecting threshold time (N×T1) by multiplying the measured rise interval T1 by N times as indicated by a one-dot chain line in FIG. 3.

Here, because the missing tooth section provided on the rotor 49A of the crank angle sensor 47 has two missing tooth and the reference position signal K is a period during which the pulse signal of every 10° CA misses twice, N described above is set at 2.5 for example.

Then, the missing tooth detecting circuit 63 determines that the reference position signal K is outputted from the crank angle sensor 49And turns a missing tooth detecting signal FK to high level only for a certain period when the timer value T2 exceeds the threshold time (N×T1), i.e., at time ta in case of FIG. 3 where it is detected that the NE signal does not rise even when the threshold time (N×T1) set at that time elapses from the previous rise timing of the NE signal.

It is noted that the missing tooth detecting signal FK is returned to low level at the timing when the NE signal falls next time. The level reading circuit 65, the 30° CA signal generating circuit 69And the crank counter counting circuit 69 can find that the reference position signal K has been generated as the reference position signal K rises to high level.

When the missing tooth detecting signal FK rises as shown in FIG. 3, the level reading circuit 65 reads the logical level of the G signal from the cam angle sensor 49 at that timing and stores the logical level Gr (read level) of the read G signal. It is noted that the crank counter counting circuit 69 refers to this read level Gr as described later.

Figure 4:
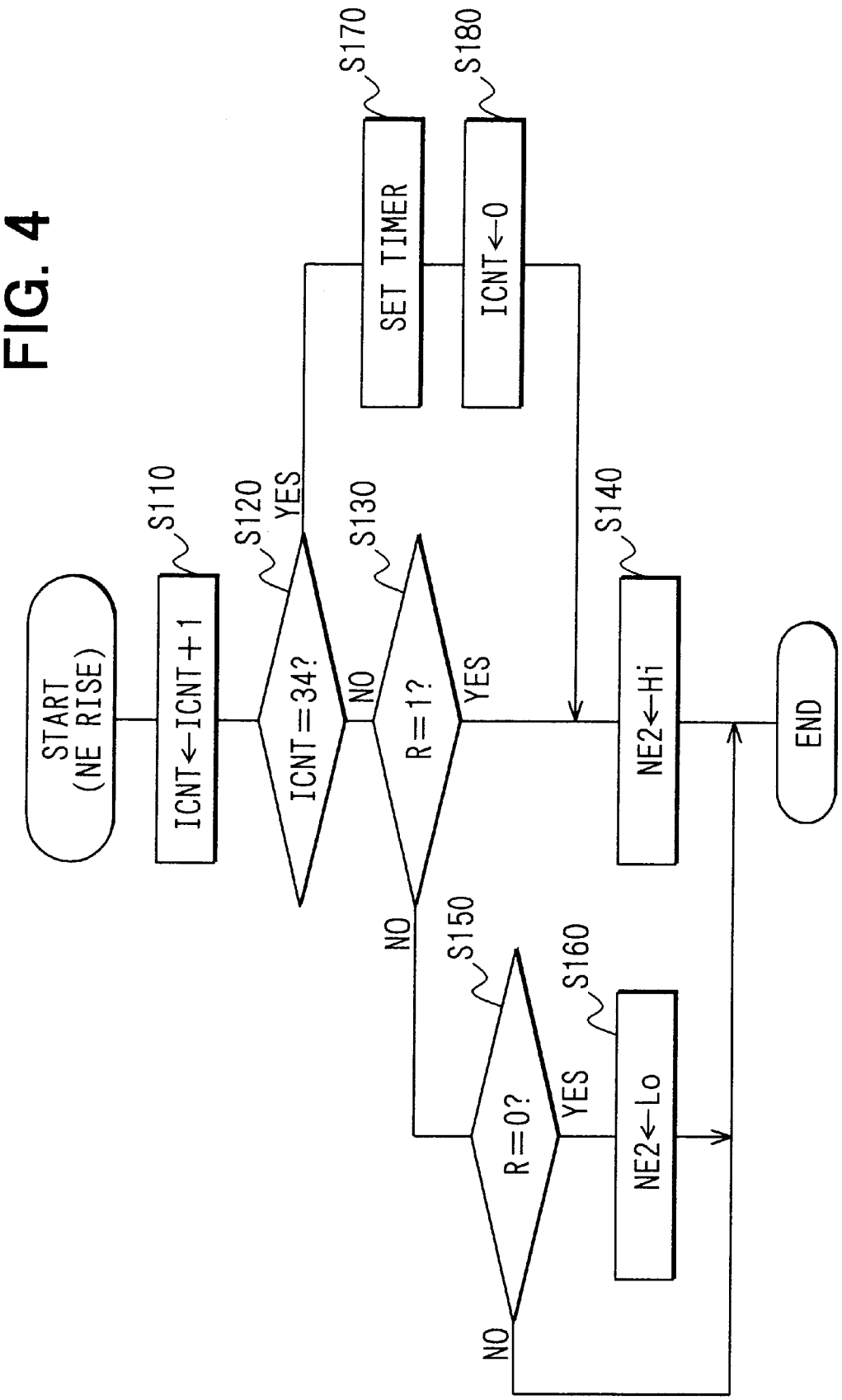
FIG. 4 is a flow chart illustrating operations of a 30° CA signal processing circuit in the first embodiment.

Next, the 30° CA signal generating circuit 67 resets a value of an internal counter ICNT to zero when the missing tooth detecting signal FK rises for the first time after when the starter signal STA has turned to high level and generates the 30° CA signal NE2 thereafter by carrying out the operation shown in the flow chart in FIG. 4 every time when the NE signal rises.

That is, when the NE signal rises, the 30° CA signal generating circuit 67 increments the internal counter value ICNT described above at first by one (S110) and then determines whether or not the internal counter value ICNT is 34 (S120).

When the internal counter value ICNT is not 34 (NO at S120), the 30° CA signal generating circuit 67 determines whether or not a remainder R obtained by dividing the internal counter value ICNT by 3 is 1 (S130) and turns the 30° CA signal NE2 to high level when the remainder is one (YES at S130) (S140). When the remainder R is not one (NO at S130), it determines whether or not the remainder R obtained by dividing the internal counter value ICNT by 3 is zero (S150). When the remainder R is zero (YES at S150), it turns the 30° CA signal NE2 to low level (S160) and the remainder R is not zero (NO at S150), it waits for the next rise of the NE signal without changing the logical level of the 30° CA signal NE2.

Meanwhile, when the internal counter value ICNT is 34 (YES at S120), it sets the internal timer so that the 30° CA signal NE2 turns to low level after a certain period of time from that point of time (S170). It also returns the internal counter value ICNT to zero (S180) and turns the 30° CA signal NE2 to high level (S140). Therefore, when the internal counter value ICNT is returned from 34 to zero, the 30° CA signal NE2 is turned from low level to high level and is returned to low level after the certain period of time in accordance with the internal timer described above.

That is, the 30° CA signal generating circuit 67 counts up the internal counter value ICNT by one each every time when the NE signal rises starting from the time when the reference position signal K occurs and returns the value to zero when the value becomes 34. Further, when the internal counter value ICNT is any one of 1 through 33, the 30° CA signal generating circuit 67 turns the 30° CA signal NE2 to high level when the remainder R obtained by dividing the internal counter value ICNT by 3 is 1 or 2, turns the 30° CA signal NE2 to low level when the remainder R is zero and turns the 30° CA signal NE2 to high level only for the certain period of time in accordance with the internal timer when the internal counter value ICNT is returned from 34 to zero.

Thus, the 30° CA signal NE2 becomes a signal which rises per 30° CA in synchronism with the NE signal by such operation of the 30° CA signal generating circuit 67.

When the starter signal STA turns to high level, the crank counter counting circuit 69 sets the value CNT of the crank counter 68 to zero. Then, it initializes and counts up the value CNT of the crank counter 68 by carrying out the processes shown in a flow chart in FIG. 6 every time when the 30° CA signal NE2 rises. It is noted that in FIG. 6, G-new is a 1 bit storage section for storing the latest read level Gr (read level Gr of this time) of the G signal read this time by the level reading circuit 65 and G-old is a 1 bit storage section for storing the read level Gr (read level Gr of the previous time) of the G signal read in the previous time by the level reading circuit 65.

Figure 6:
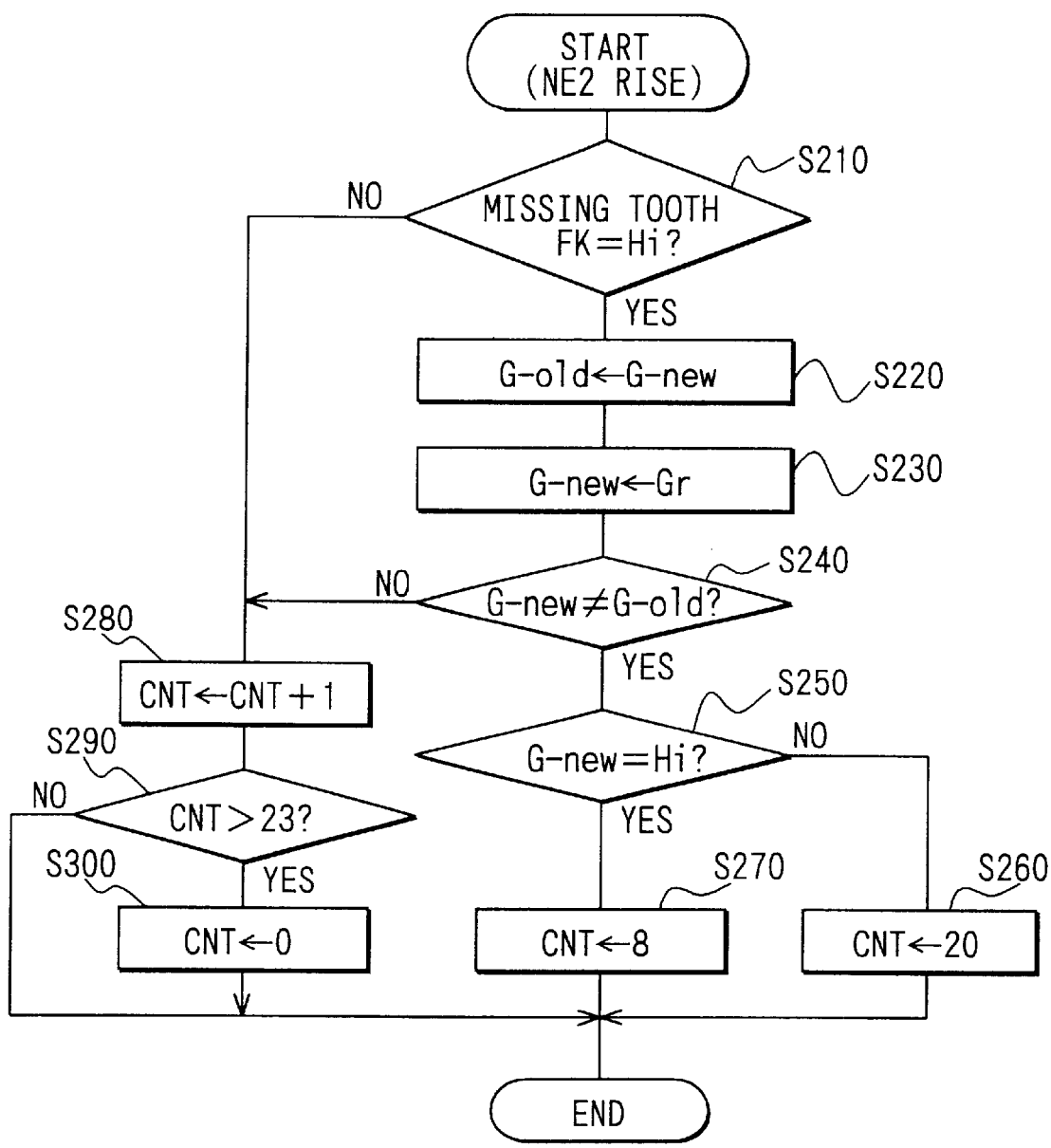
FIG. 6 is a flow chart showing processes executed in a crank counter counting circuit in the first embodiment.

When, the 30° CA signal NE2 rises, the crank counter counting circuit 69 determines whether or not the missing tooth detecting signal FK from the missing tooth detecting circuit 63 is high level at S210 at first as shown in FIG. 6.

When the missing tooth detecting signal FK is high level, the crank counter counting circuit 69 determines that the timing is the missing tooth detecting timing in which the missing tooth detecting circuit 63 detects the reference position signal K within the NE signals. In this case, because the level reading circuit 65 has read the logical level of the G signal just before the 30° CA signal NE2 rises this time, it advances the process to S220 to store the logical level within G-new to G-old and stores the read level Gr of the G signal read this time by the level reading circuit 65 to G-new.

However, because there exists no previously read level Gr of the G signal when it is determined that the missing tooth detecting signal FK is high level for the first time at S210 after when the starter signal STA has turned to high level, a logical level opposite from the read level Gr read this time by the level reading circuit 65 is stored in G-old at S220.

After finishing the processes at S220 and 230, the crank counter counting circuit 69 determines whether or not the logical level within G-new does not coincide with the logical level within G-old at S240. When the both logical levels do not coincide, the crank counter counting circuit 69 advances the process to S250 to determine whether or not the logical level within G-new, i.e., the read level Gr of this time, is high level.

When the logical level within G-new is not high level, i.e., when it is low level, the crank counter counting circuit 69 initializes the value CNT of the crank counter 68 to 20 which corresponds to a first value and then ends the process. When the crank counter counting circuit 69 determines that the logical level within G-new is high level at S250 on the other hand, it advances the process to S270 to initialize the value CNT of the crank counter 68 to 8 which corresponds to a second value and then ends the process.

Meanwhile, when the crank counter counting circuit 69 determines that the missing tooth detecting signal FK is not high level and the timing is not the missing tooth detecting timing at S210 described above or when it determines that the logical level within G-new coincides with the logical level within G-old at S240 described above, it advances the process to S280 to increment the value CNT of the crank counter 68 by one (counts up by one).

Then, in the following S290, the crank counter counting circuit 69 determines whether the value CNT of the crank counter 68 exceeds 23. When the value does not exceed 23, the crank counter counting circuit 69 ends the process as it is. When the value exceeds 23, i.e., the value reaches 24, the crank counter counting circuit 69 ends the process after returning the value CNT of the crank counter 68 to zero at S300.

That is, while the crank counter counting circuit 69 counts up the value CNT of the crank counter 68 by one each within the range of zero to 23 which corresponds to 720° CA basically by the processes of S280 to 300 every time when the 30° CA signal NE2 rises, it determines whether or not the value CNT of the crank counter 68 should be initialized by the processes of S220 through S270 in the rising timing of the 30° CA signal NE2 (YES at S210) immediately after when the reference position signal K within the NE signal is detected by the missing tooth detecting circuit 63 and the logical level of the G signal is read by the level reading circuit 65.

When the value is to be initialized, it initializes the value CNT of the crank counter 68 to 20 when the read level Gr of this time is low level or to 8 when the read level Gr of this time is high level in response to the read level Gr of the G signal of this time (the G signal level at the point of time when the missing tooth are detected this time) as shown in the following Table 1.

TABLE 1

|  | G signal level at point of time when missing tooth are detected previously | G signal level at point of time when missing tooth are detected this time | Preset value of crank counter |
| --- | --- | --- | --- |
| CASE 1 | Hi | Lo | 20 |
| CASE 2 | Lo | Hi | 8 |
| CASE 3 | Hi | Hi | Not initialized |
| CASE 4 | Lo | Lo | |
| First time after starter switch is turned on | — | Lo | 20 |
| | | Hi | 8 |

Specifically, as shown in the column of "First time after the starter switch is on" and each column of the "Case 1" and "Case 2" in Table 1, the crank counter counting circuit 69 initializes the value CNT of the crank counter 68 to 20 when the read level Gr of this time is low level or to 8 when the read level Gr of this time is high level by the processes of S250 through 270 when the logical level of the G signal is read by the level reading circuit 65 for the first time since when the starter switch has been turned on and in the normal case (YES at S240) during which the previous read level Gr of the G signal (G signal level at the point of time when the missing tooth are detected previously) does not coincide with the read level Gr of this time (G signal level at the point of time when the missing tooth are detected this time).

On the contrary, the crank counter counting circuit 69 counts up normally (S280) without initializing the value CNTG of the crank counter 68 through the processes S250 through 270 when the previously read level Gr of the G signal coincides with the read level Gr of this time (NO at S240) as shown in each column of the "Case 3" and "Case 4" in Table 1.

Therefore, when the G signal inputted from the cam angle sensor 49 to the signal processing circuit 43 of the ECU 45 is normal in the engine control apparatus of the present embodiment, the value of the crank counter 68 is normally updated.

That is, when the starter signal STA turns to high level at time t1, the missing tooth detecting circuit 63 starts the operation for detecting the reference position signal K within the NE signals and the crank counter counting circuit 69 clears the value CNT of the crank counter 68 to zero as illustrated in FIGS. 2A and 2B.

When the reference position signal K is outputted from the crank angle sensor 47 for the first time and the missing tooth detecting circuit 63 detects the reference position signal K at time t2, the level reading circuit 65 reads the logical level of the G signal from the cam angle sensor 49 and the 30° CA signal generating circuit 67 generates the 30° CA signal by carrying out the operation shown in FIGS. 4 and 5 per rise of the NE signal from that point of time.

It is noted that although FIGS. 2A and 2B show as if the timing (time t2, t3, t4, t5, t6 and t7) when the missing tooth detecting circuit 63 detects the reference position signal K is the same with the NE signal rising timing when the reference position signal K ends, the timing when the missing tooth detecting circuit 63 detects the reference position signal K actually comes slightly before the NE signal rising timing when the reference position signal K ends as indicated by time ta in FIG. 3. The same applies also to FIGS. 9A, 9B and 10A, 10B described later.

Here, because the G signal is low level and the read level Gr of the G signal read by the level reading circuit 65 turns to low level when the starter signal STA turns to high level and the reference position signal K is generated for the first time in this case, the value CNT of the crank counter 68 is initialized by the crank counter counting circuit 69 to 20 at the rising timing of the 30° CA signal NE2 immediately after that time t2. Then, the value CNT of the crank counter 68 is counted up to 20->21->22->23->0->1->2->3 . . . every time when the 30° CA signal NE2 rises.

Because the G signal turns to high level at time t3 from the opposite level at time t2 when the reference position signal K is generated and the missing tooth detecting circuit 63 detects the reference position signal K and the read level Gr of the G signal read by the level reading circuit 65 turns to high level, the value CNT of the crank counter 68 is initialized by the crank counter counting circuit 69 to 8 at the rising timing of the 30° CA signal NE2 immediately after that time t3. Then, the value CNT of the crank counter 68 is counted up to 8->9->10->11->12->13 . . . every time when the 30° CA signal NE2 rises.

Because the G signal turns to low level at time t4 from the opposite level at time t3 when the reference position signal K is generated and the missing tooth detecting circuit 63 detects the reference position signal K and the read level Gr of the G signal read by the level reading circuit 65 turns to low level, the value CNT of the crank counter 68 is initialized by the crank counter counting circuit 69 to 20 at the rising timing of the 30° CA signal NE2 immediately after that time t4. Then, the value CNT of the crank counter 68 is counted up to 20->21->22->23->0->1->2->3 . . . every time when the 30° CA signal NE2 rises.

Here, because 8 and 20 are values different from each other by a value (12) corresponding to 360° CA as the value CNT of the crank counter 68, the continuity of the value CNT of the crank counter 68 will not be lost by the initialization. That is, 8 and 20 set by the initialization are values which the value CNT of the crank counter 68 assumes even if the initialization is not executed.

Then, the similar operations with the time t2 through t4 are repeated as shown at time t4 through t9 And after the time t7 in FIGS. 2A and 2B.

Next, a identification signal generating circuit 71 of the signal processing circuit 43 turns the first signal TDC to the CPU 31 to high level and turns the second signal G2 to the CPU 31 to low level during the time when the 30° CA signal NE2 rises for the first time since when the starter signal STA has turned to high level as shown in FIGS. 2A and 2B. Then, when the starter signal STA turns to high level and the 30° CA signal NE2 rises for the first time, the identification signal generating section 71 turns the first signal TDC to low level when the value CNT of the crank counter 68 is 0 or 12, turns the second signal G2 to high level when the value CNT of the crank counter 68 is any one of 0 through 11 or turns the second signal G2 to low level when the value CNT of the crank counter 68 is any one of 12 through 23.

Then, the starter signal STA turns to high level and the 30° CA signal NE2 rises for the first time, the CPU 31 discriminates the cylinders as described below for example.

(1) The value CNT of the crank counter 68 is 20 when the second signal G2 is low level when the 30° CA signal NE2 rises for the first time since when the starter signal STA has turned to high level, so that the CPU 31 determines as 30° CA before bottom top dead center (BTDC) of the sixth cylinder.

(2) The value CNT of the crank counter 68 is 8 when the second signal G2 is high level when the 30° CA signal NE2 rises for the first time since when the starter signal STA has turned to high level, so that the CPU 31 determines as BTDC 30° CA of the third cylinder.

(3) The value CNT of the crank counter 68 is 0 when the first signal TDC is low level and the second signal G2 is high level beside the cases (1) and (2), so that the CPU 31 determines as BTDC 30° CA of the first cylinder. Then, the CPU 31 determines as BTDC 30° CA of the second cylinder when it detects that the 30° CA signal NE2 has risen four times because the value CNT of the crank counter 68 is 4 and then determines as BTDC 30° CA of the third cylinder when it detects that the 30° CA signal NE2 has risen four times after that because the value CNT of the crank counter 68 is 8.

Further, the CPU 31 determines as BTDC 30° CA of the fourth cylinder when the first signal TDC is low level and the second signal G2 is low level because the value CNT of the crank counter 68 is 12 and then determines as BTDC 30° CA of the fifth cylinder when it detects that the 30° CA signal NE2 has risen four times after that because the value CNT of the crank counter 68 is 16. It then determines as BTDC 30° CA of the sixth cylinder when it detects that the 30° CA signal NE2 has risen four times after that because the value CNT of the crank counter 68 is 20.

The CPU 31 discriminates the cylinders based on the value CNT of the crank counter 68 after all by discriminating the cylinders as shown in (1) through (3) from the 30° CA signal NE2, the first signal TDC and the second signal G2 outputted from the signal processing circuit 43.

According to the engine control apparatus of the first embodiment described above, although it is possible to start to control the engine by discriminating the cylinders from the point of time (time t2 in FIG. 2A) when the reference position signal K from the crank angle sensor 47 is detected first, the value CNT of the crank counter 68 is initialized only to either 8 or 20 every time when the reference position signal K from the crank angle sensor 47 is detected, i.e., per 360° CA, and the cylinders cannot be discriminated correctly when the logical level of the G signal is fixed to either one of high level and low level as an abnormality occurs in the cam angle sensor 49 or in the wire from the cam angle sensor 49 if the crank counter counting circuit 69 does not carry out the processes of S220 through 240 in FIG. 6.

According to the engine control apparatus of the first embodiment, however, when the level reading circuit 65 reads the logical level of the G signal as the crank counter counting circuit 69 carries out the processes of S220 through S240, the logical level read this time is compared with the logical level read previously by the level reading circuit 65 so as not to initialize the value CNT of the crank counter 68 by the processes of S250 through 270 when the both logical levels coincide. That is, when the level reading circuit 65 reads the logical level of the G signal, the value CNT of the crank counter 68 is initialized to 8 or 20 in response to the logical level of the G signal read this time only when the logical level of the read this time is different from the logical level read previously by the level reading circuit 65.

Figure 9A:
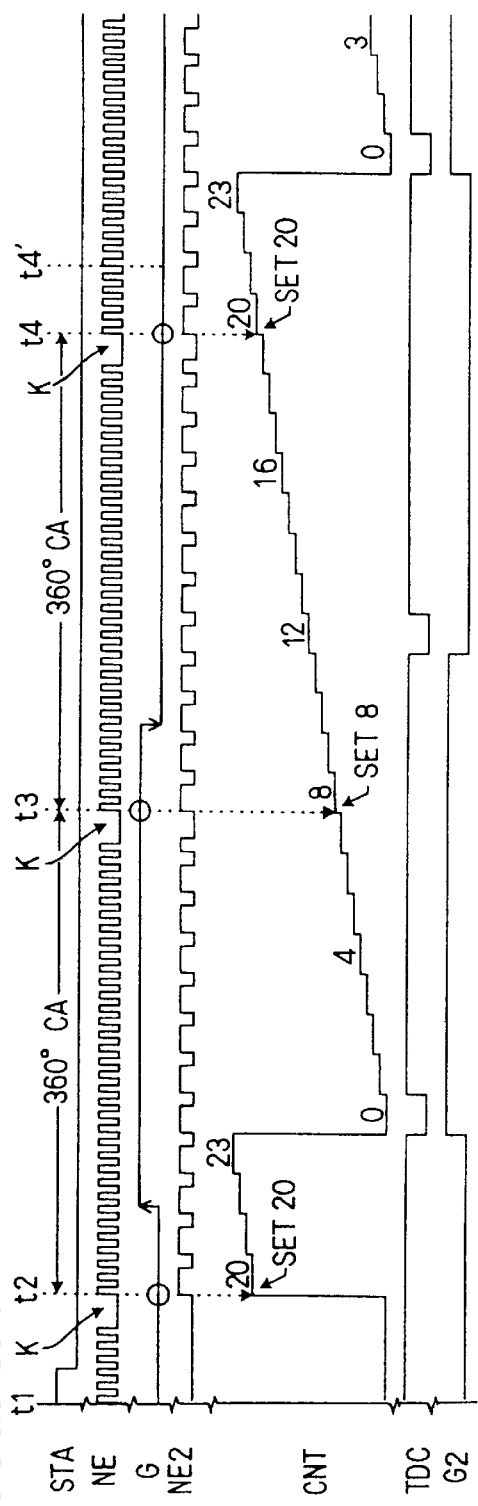
FIGS. 9A and 9B are time charts showing the operations and effects of the first embodiment.
Figure 9B:
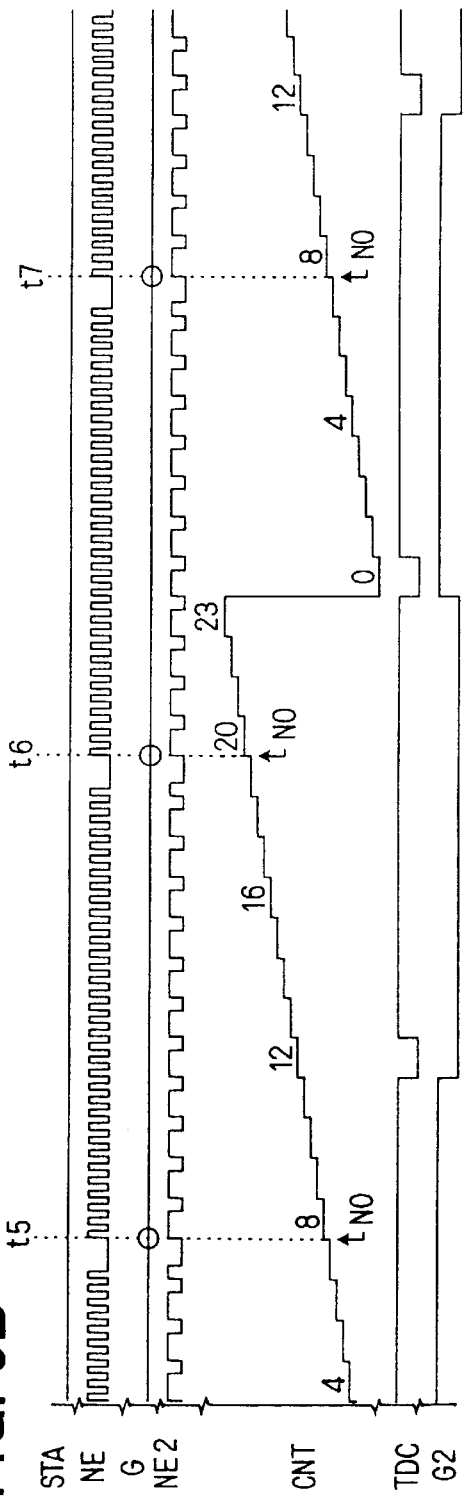

Therefore, according to the first embodiment, when the G signal is fixed to low level as an abnormality occurs in the wire from the cam angle sensor 49 or in the cam angle sensor 49 itself at time t4' which corresponds to time between time t4 and time t5 in FIGS. 2A and 2B, the value CNT of the crank counter 68 is not initialized in response to the read level Gr of the G signal even if the reference position signal K within the NE signal is detected by the missing tooth detecting circuit 63 at times t5, t6 and t7 thereafter as illustrated in FIGS. 9A and 9B.

Therefore, even if an abnormality occurs in the cam angle sensor 49 or in the wire from the cam angle sensor 49, the first embodiment allows the continuity of the value CNT of the crank counter 68 to be maintained in the same manner as in the normal time and allows the cylinders to be discriminated correctly as a result as it is apparent from the comparison of FIGS. 2A, 2B and FIGS. 9A, 9B.

(Second Embodiment)

The engine control apparatus of the second embodiment is different from the first embodiment in the following points (1) and (2).

Figure 7:
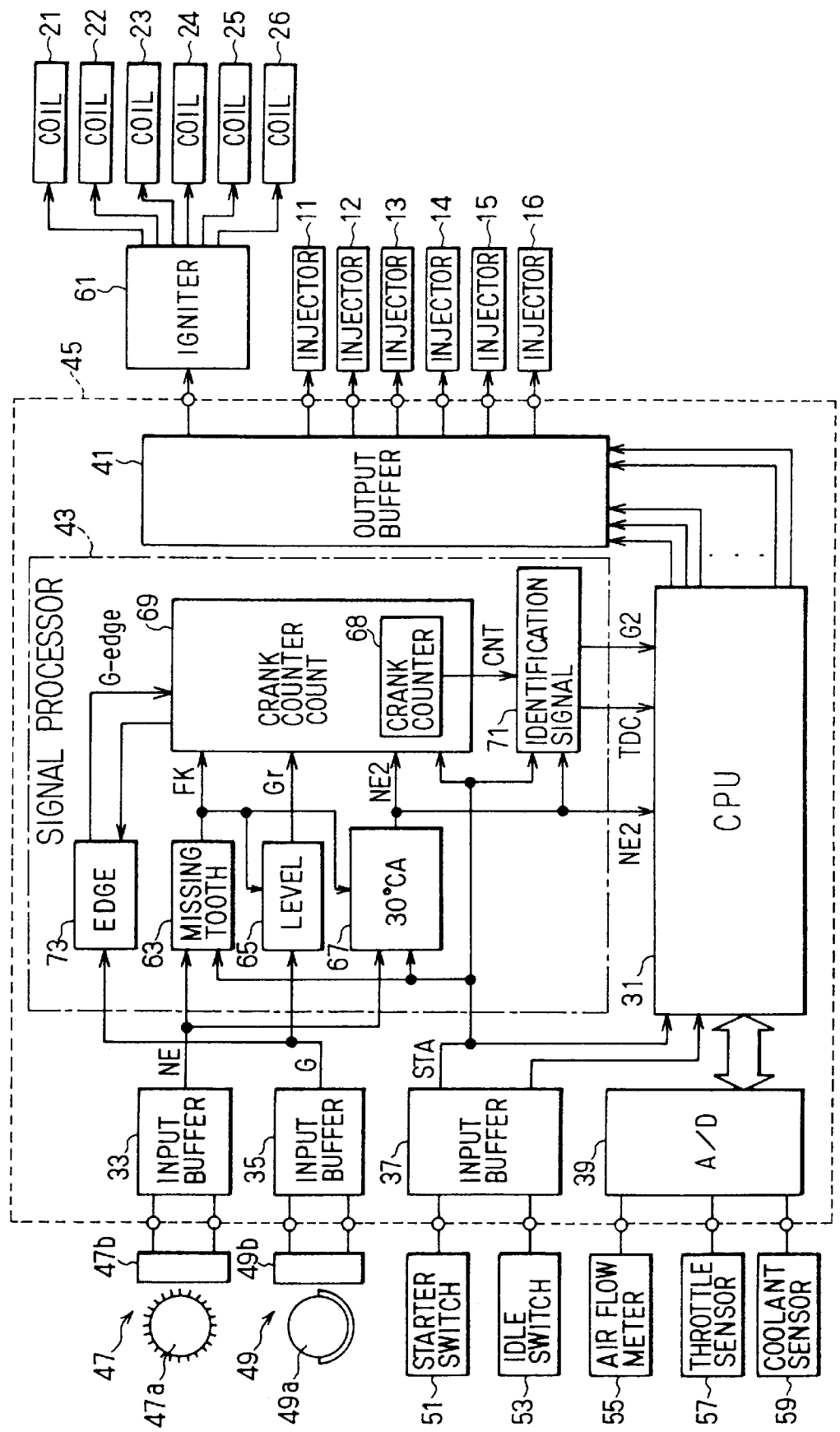
FIG. 7 is a block diagram illustrating the structure of an engine control apparatus according to a second embodiment of the invention.

(1) The signal processing circuit 43 is additionally provided with an edge detecting circuit 73 for detecting edges (both leading and trailing edges) of the G signal from the cam angle sensor 49 as shown in FIG. 7.

Receiving an edge detection starting command from the crank counter counting circuit 69, the edge detecting circuit 73 monitors the G signal during the time until when it receives an edge detection ending command from the crank counter counting circuit 69 and sets a value within G-edge to 1 when the level of the G signal is reversed during that period (when an edge occurs in the G signal). It is noted that G-edge is a 1 bit storage section for storing the result of detection of edge of the G signal and the crank counter counting circuit 69 refers to that value.

Figure 8:
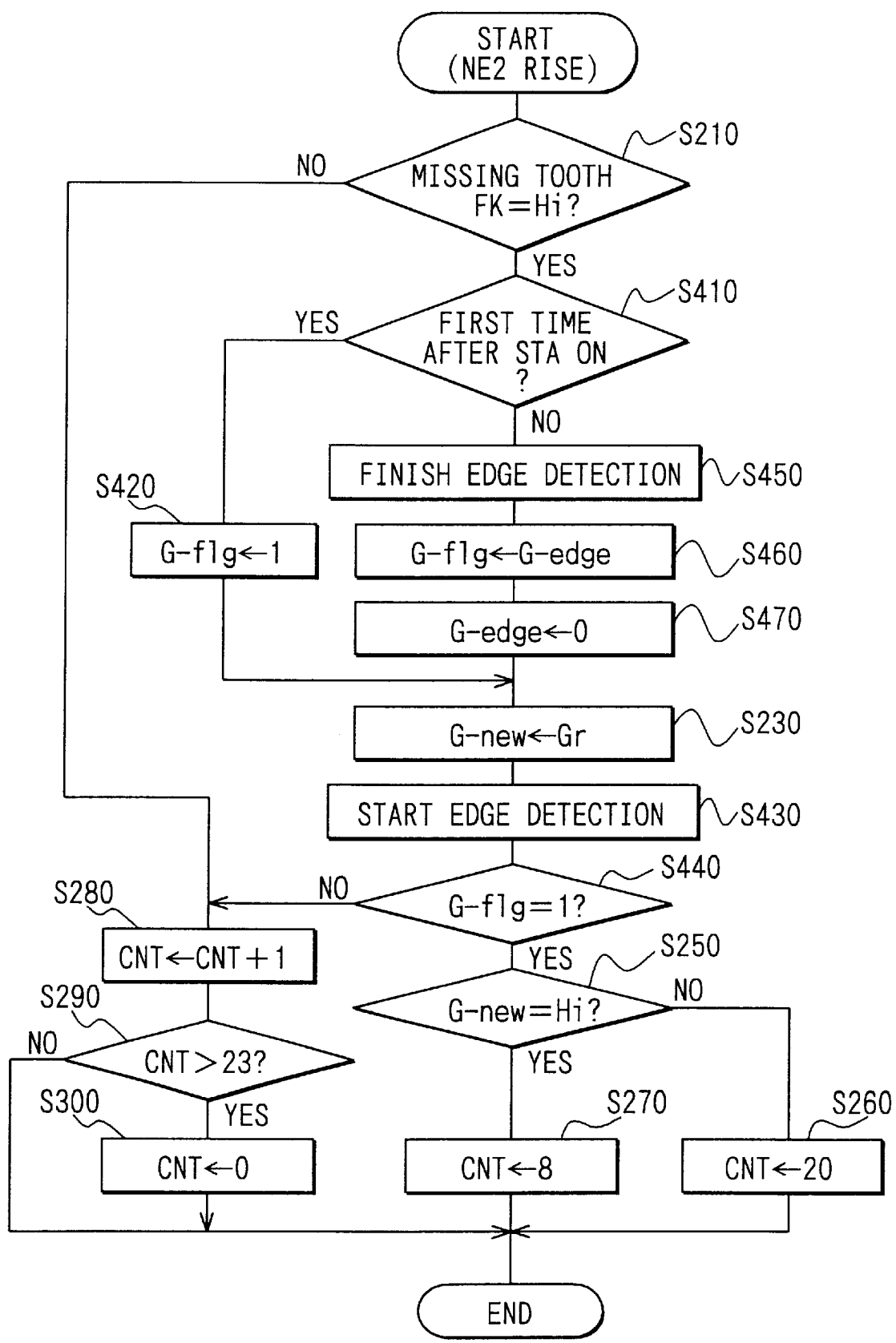
FIG. 8 is a flow chart showing processes executed in a crank counter counting circuit in the second embodiment.

(2) The crank counter counting circuit 69 carries out processes in FIG. 8 instead of the processes in FIG. 6. The processes executed by the crank counter counting circuit 69 in the second embodiment will be explained with reference to FIG. 8. In FIG. 8, a G-flag is a 1-bit storage section for storing the result of detection of edge of the G signal similarly to G-edge described above. When the starter signal STA turns to high level, the crank counter counting circuit 69 sets the value CNT of the crank counter 68 and the value within G-edge to zero and carries out the processes shown in FIG. 8 every time when the 30° CA signal NE2 rises.

When the 30° CA signal NE2 rises, the crank counter counting circuit 69 determines whether or not the timing is the missing tooth detecting timing (timing in which the reference position signal K within the NE signal is detected by the missing tooth detecting circuit 63) based on the missing tooth detecting signal FK from the missing tooth detecting circuit 63 as described before at S210 at first as shown in FIG. 8. When the crank counter counting circuit 69 determines that it is the missing tooth detecting timing, it advances the process to S410 to determine whether it is the first time after when the starter switch has been turned on, i.e., it is the case when it determines as the missing tooth detecting timing for the first time since when the starter signal STA has turned to high level.

When the crank counter counting circuit 69 determines that it is the first time after when the starter switch has been turned on, it advances the process to S230 after setting G-flag to 1 at S420. The crank counter counting circuit 69 stores the read level Gr of the G signal read this time by the level reading circuit 65 to G-new at S230 and gives the edge detection starting command to the edge detecting circuit 73. Then, the edge detecting circuit 73 starts the operation for detecting the edges of the G signal.

Further, the crank counter counting circuit 69 determines whether or not the value within G-flag is 1 at S440. When the value within G-flag is 1, the crank counter counting circuit 69 initializes the value CNT of the crank counter 68 to 8 or 20 in response to the read level Gr of the G signal of this time (logical level within G-new) by the processes S250 through S270 described above and then ends the processes. When the value within G-flag is not 1 (if 0) at S440, the crank counter counting circuit 69 counts up the value CNT of the crank counter 68 by the processes S280 through 300 described above and then ends the process.

However, when the crank counter counting circuit 69 determines to be the first time after when the starter switch has been turned on at S410, it is always determined to be YES at S440 because 1 is set in G-flag at S420 and the value CNT of the crank counter 68 is initialized to 8 or 20 by the processes of S250 through S270.

Meanwhile, when the crank counter counting circuit 69 determines that it is not the first time after when the starter switch has been turned on at S410, it advances the process to S450 to give the edge detection ending command to the edge detecting circuit 73. Then, the edge detecting circuit 73 stops the operation for detecting the edges of the G signal.

Next, the crank counter counting circuit 69 stores the value within G-edge set at 1 or 0 by the edge detecting circuit 73 in G-flag. Then, it advances the process to S230 after resetting the value of G-edge at S470.

Then, the crank counter counting circuit 69 stores the read level Gr of the G signal read this time by the level reading circuit 65 to G-new also in this case. The crank counter counting circuit 69 gives the edge detection starting command to the edge detecting circuit 73 and the edge detecting circuit 73 restarts the operation for detecting the edges of the G signal at S430. The crank counter counting circuit 69 also determines whether or not the value within G-flag is 1. When the value within G-flag is 1, the crank counter counting circuit 69 initializes the value CNT of the crank counter 68 to 8 or 20 by the processes of S250 through S270. When the value within G-flag is zero, the crank counter counting circuit 69 counts up normally by the processes of S280 through S300 without initializing the value CNT of the crank counter 68.

Accordingly, when the level of the G signal is not reversed even once from the time when the crank counter counting circuit 69 has determined previously as the missing tooth detecting timing at S210 to the time when the crank counter counting circuit 69 determines as the missing tooth detecting timing this time, the edge detecting circuit 73 detects no edge of the G signal and the value within G-flag discriminated at S440 becomes zero, so that the initialization of the value CNT of the crank counter 68 is prohibited.

That is, according to the second embodiment, the value CNT of the crank counter 68 is initialized to 8 or 20 corresponding to the read level Gr of the G signal of this time (G signal level at the point of time when the missing tooth are detected this time) when the level reading circuit 65 reads the logical level of the G signal for the first time since when the starter switch has been turn on and when the level of the G signal is reversed (YES at S440) within the discriminating section which is the period from when the level reading circuit 65 has read the logical level of the G signal previously till when it is read this time as shown in the column of "FIRST TIME AFTER STA ON" and in the respective columns of "Case 1", and "Case 2" in the following table.

On the contrary, when the level of the G signal has not been reversed even once within the discriminating section described above (NO at S440), the crank counter counting circuit 69 counts up normally without initializing the value CNT of the crank counter 68 as shown in the respective columns of "Case 3" and "Case 4" in Table 2.

TABLE 2

| | Whether G signal is inverted within discriminating section | G signal level at point of time when missing tooth are detected this time | Preset value of crank counter |
|---|---|---|---|
| CASE 1 | Exist | Lo | 20 |
| CASE 2 | Exist | Hi | 8 |
| CASE 3 | None | Hi | Not initialized |
| CASE 4 | None | Lo | Not initialized |
| First time after starter switch is turned on | — | Lo | 20 |
| | | Hi | 8 |

Therefore, because the G signal rises from low level to high level in the discriminating section of time t2 through t3 among the respective times t2, t3, t4, t5, t6 and t7 when the reference position signal K within the NE signal is detected by the missing tooth detecting circuit 63 and the logical level of the G signal is read by the level reading circuit 65 as shown in FIGS. 10A and 10B similarly to FIGS. 9A and 9B, the value CNT of the crank counter 68 is initialized at the rising timing of the 30° CA signal NE2 immediately after time t3. Similarly to that, the value CNT of the crank counter 68 is initialized to 20 at the rising timing of the 30° CA signal NE2 immediately after time t4 because the G signal falls from high level to low level at the discriminating section of t3 to t4.

When an abnormality occurs in the wire from the cam angle sensor 49 or in the cam angle sensor 49 itself and the G signal is fixed to low level at time t4' between time t4 and time t5 for example, the value CNT of the crank counter 68 is not initialized corresponding to the read level Gr of the G signal even if the reference position signal K within the NE signals is detected by the missing tooth detecting circuit 63 at times t5, t6 and t7 thereafter.

According to the second embodiment, when the logical level of the G signal has not been reversed even once during the period from when the logical level of the G signal has been read previously by the level reading circuit 65 until when it is read this time, the initialization of the value CNT of the crank counter 68 is stopped as described above. The second embodiment also allows the continuity of the value CNT of the crank counter 68 to be maintained in the same manner with the normal time and the cylinders to be discriminated correctly even if an abnormality occurs in the cam angle sensor 49 or in the wire from the cam angle sensor 49 similarly to the engine control apparatus of the first embodiment.

The above embodiments may be modified in various ways.

For instance, the value of the initialized value CNT of the crank counter 68 is not limited to be 8 or 20. They may be values which are different each other by 360° CA like 0 and 12 and 5 and 17.

Further, although the value CNT of the crank counter 68 has been counted up in the respective embodiments, it is possible to arrange so as to count down the value CNT of the crank counter 68. Specifically, the value CNT of the crank counter 68 may be decremented (count down by one) at S280 in FIGS. 6 and 9 for example. Then, it is determined whether or not the value CNT of. the crank counter 68 has become smaller than zero at S290. When it is smaller than zero, the value CNT of the crank counter 68 is returned to 23 which is the maximum value at S300. The value CNT of the crank counter 68 is initialized to 3 for example at S260 and the value CNT of the crank counter 68 may be initialized to 15 for example at S270. The method for generating the first signal TDC and the second signal G2 or the cylinder discriminating method in the CPU 31 may be changed in response to such changes.

Although the level of the G signal outputted from the cam angle sensor 49 has been reversed once per 360° CA in the respective embodiments described above, the logical level of the G signal may be what is different alternately per each timing when the reference position signal K is outputted from the crank angle sensor 47 or the G signal may be a signal whose level is reversed by a plurality of times during the period when the pulse signals are outputted from the crank angle sensor 47.

The level reading circuit 65 may be arranges so as to read the logical level of the G signal at the timing when the missing tooth detecting signal FK from the missing tooth detecting circuit 63 has risen and the NE signal has risen for the first time, i.e., at time tb in FIG. 3.

Further, although the respective embodiments have been described such that each section of the signal processing circuit 43 operate from the first time starting from the time when the starter switch is turned on, it is possible to arrange such that the respective sections of the signal processing circuit 43 operate from the first time starting from the time when other factors occur such as power-on reset of the power source and when it is detected that engine speed is zero.

(Third Embodiment)

Figure 11:
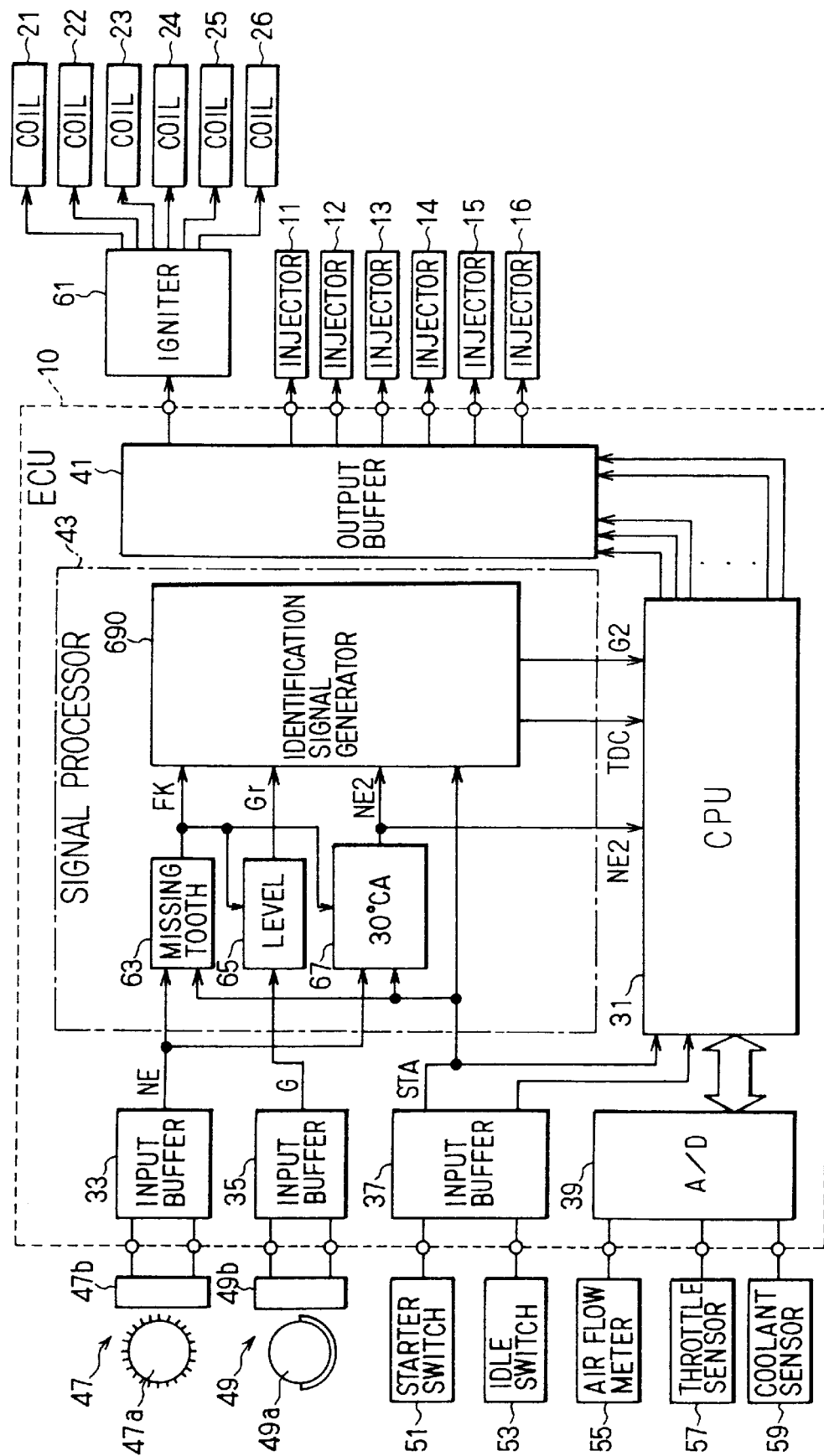
FIG. 11 is a block diagram showing the structure of an engine control apparatus according to a third embodiment of the invention.

In a third embodiment shown in FIG. 11, an engine control apparatus further comprises a identification signal generating circuit 690 for generating a reference position signal TDC and a second cylinder identification signal G2 in connection with the respective circuits 63, 65 and 67.

Figure 12:
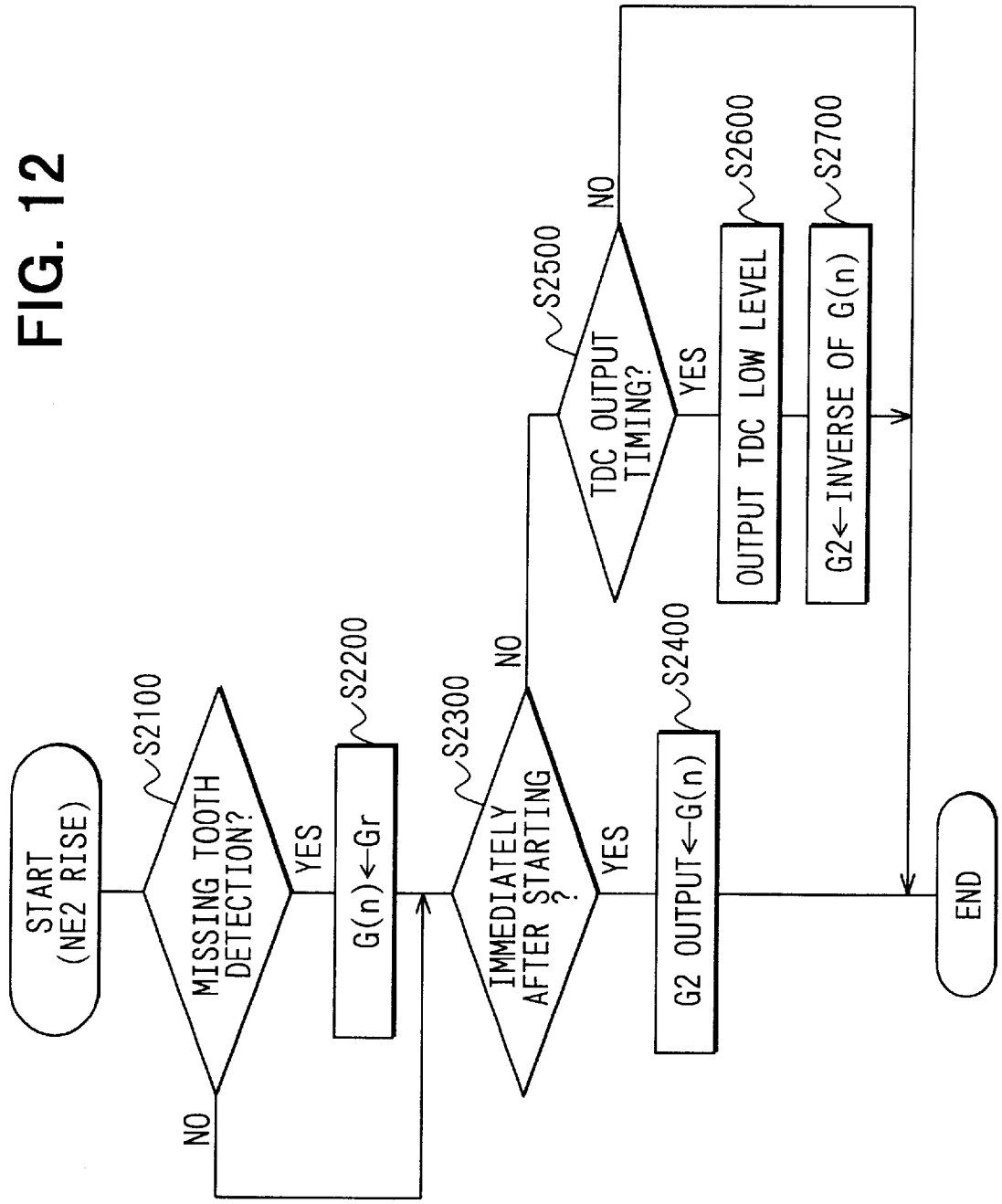
FIG. 12 is a flow chart showing the operation of a identification signal generating circuit in a signal processing circuit of the third embodiment.

As shown in FIG. 12, when the 30° CA signal NE2 rises, the identification signal generating circuit 690 determines whether or not it is the missing tooth detecting timing in which the missing tooth detecting circuit 63 detects the missing tooth signal K within the crank rotation signal NE by determining whether or not the missing tooth detecting signal FK from the missing tooth detecting circuit 63 is high level at S2100 at first.

When the identification signal generating circuit 690 determines that the timing is the missing tooth detecting timing, it stores the read level Gr of the cylinder identification signal G read this time by the level reading circuit 65 to G(n) at S2200 and then advances the process to S2300 because the logical level of the cylinder identification signal G has been read by the level reading circuit 65 just before the 30° CA signal NE2 rises. When it determines that the timing is not the missing tooth detecting timing, it shifts the process to S2300 as it is.

Next, the identification signal generating circuit 690 determines whether it is the timing when the 30° CA signal NE2 has risen for the first time since the starter signal STA has risen at S2300. When it is determined to be YES, the identification signal generating circuit 690 determines that it is the timing immediately after the start of the engine in which the missing tooth signal K is generated for the first time within the crank rotation signal NE and advances the process to S2400. Then, the identification signal generating circuit 690 sets an output level of the second cylinder identification signal G2 to the CPU 31 to the logical level within G(n) at S2400 and ends the process.

Therefore, when the starter signal STA rises and the missing tooth signal K is generated within the crank rotation signal NE for the first time, the second cylinder identification signal G2 to the CPU 31 turns to the same level with the logical level of the cylinder identification signal G at that time.

Meanwhile, when the circuit 690 determines that it is not immediately after the start of the engine at S2300, it shifts the process to S2500 to determine whether or not it is timing when the reference position signal TDC is to be turned to low level (TDC output timing). It is noted that the identification signal generating circuit 690 determines whether it is the TDC output timing by determining whether it is timing when the 30° CA signal NE2 has risen four times since when the identification signal generating circuit 690 has determined to be the missing tooth detecting timing at S2100.

Then, when the identification signal generating circuit 690 determines that it is not the TDC output timing, it ends the process as it is. When the identification signal generating circuit 690 determines that it is the TDC output timing, it advances the process to S2600 to turn the reference position signal TDC to the CPU 31 to low level during the period until when the 30° CA signal NE2 rises next, i.e., during the time until when the next process is started. Then, the identification signal generating circuit 690 sets the output level of the second cylinder identification signal G2 to the CPU 31 at the level opposite from the logical level within G(n) at S2700 and ends the process.

Therefore, the logical level of the second cylinder identification signal G2 is set at the level opposite from the logical level of the cylinder identification signal G read in detecting the missing tooth just before timing per every such timing when the reference position signal TDC turns to low level.

That is, the signal processing circuit 43 generates the reference position signal TDC and the second cylinder identification signal G2 and outputs them to the CPU 31.

Figure 13:
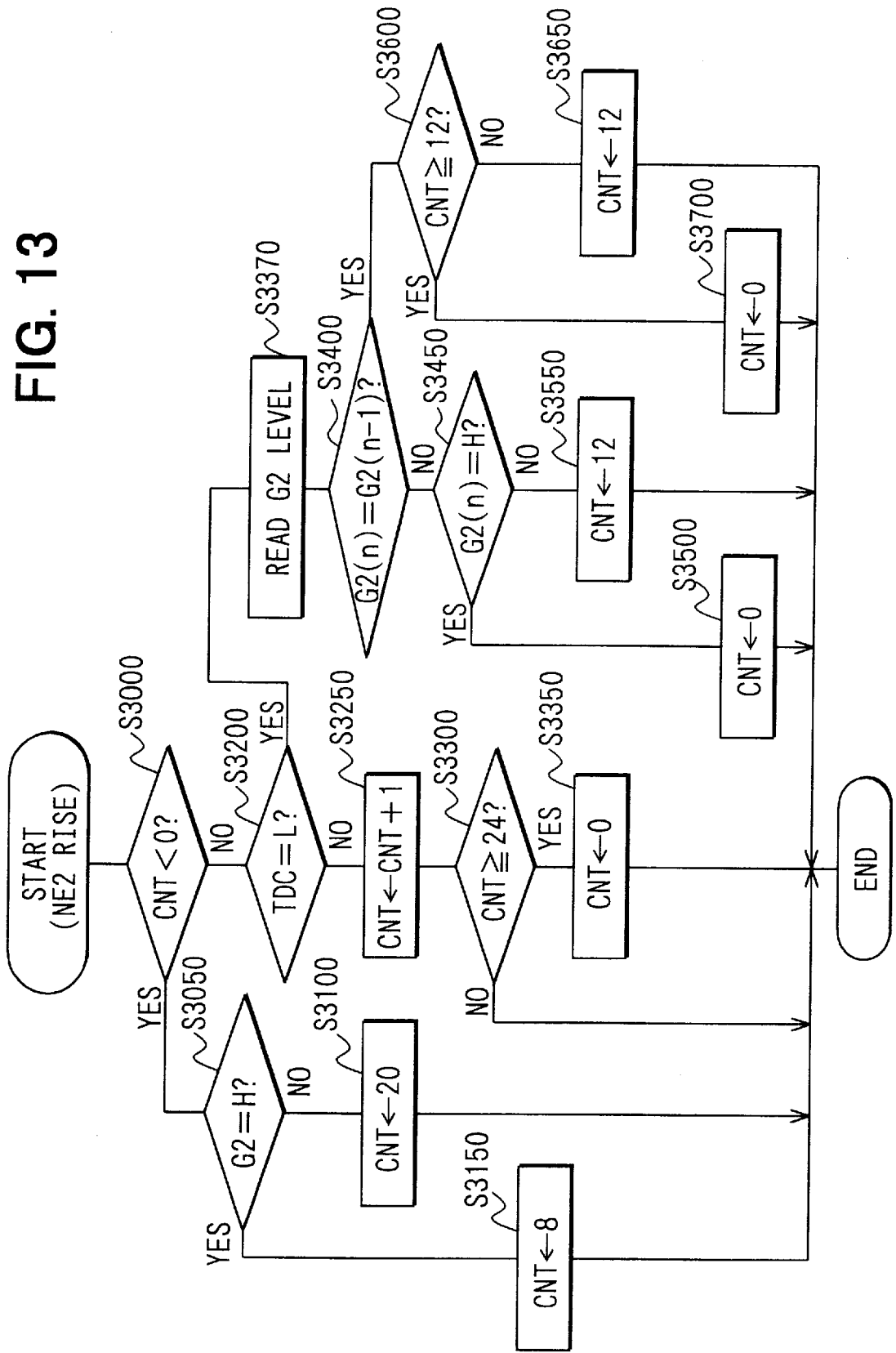
FIG. 13 is a flow chart showing the processes executed by a CPU of the third embodiment.

In the third embodiment, the CPU 31 sets the value of the internal crank counter (corresponds to the count value) at −1 when the starter signal STA rises and updates the value CNT of the crank counter thereafter by carrying out the process in FIG. 13 every time when the 30° CA signal NE2 from the signal processing circuit 43 rises. It is noted that the value CNT of the crank counter indicates the accumulated rotational angle of two turns of the crankshaft at resolution of 30° which corresponds to the cycle of the 30° CA signal NE2 and assumes a value from 0 to 23.

As shown in FIG. 13, when the 30° CA signal NE2 from the signal processing circuit 43 rises, the CPU 31 determines whether or not the present value CNT of the crank counter is smaller than 0 at S3000 at first. When it is smaller than 0, i.e., −1, the CPU 31 determines that it is the time when the engine is started when the missing tooth signal K is detected for the first time by the signal processing circuit 43 and advances the process to S3050. It is noted that in this state, the reference position signal TDC from the signal processing circuit 43 is high level.

Then, at S3050, the CPU 31 reads the logical level of the second cylinder identification signal G2 from the signal processing circuit 43 to determine whether or not the read logical level is high level. When it is not high level, i.e., when it is low level, the CPU 31 advances the process to S3100 to set the value CNT of the crank counter at 20 as a first count starting value and ends the process thereafter. When the CPU 31 determines that the logical level of the second cylinder identification signal G2 read at S3050 is high level, it shifts the process to S3150 to set the value CNT of the crank counter at 8 as a second count starting value and ends the process thereafter.

Meanwhile, when the CPU 31 determines that the present value CNT of the crank counter is not smaller than 0, i.e., more than 0, at S3000, it shifts the process to S3200 to determine whether or not the reference position signal TDC from the signal processing circuit 43 is low level.

When the CPU 31 determines here that the reference position signal TDC is not low level, i.e., high level, it advances the process to S3250 to count up the value CNT of the crank counter by one and determines at S3300 whether or not the value CNT of the crank counter has become 24 or more. When the value CNT of the crank counter is 24 is more, the CPU 31 returns the value CNT of the crank counter to 0 at S3350 and ends the process. When it determines that the value CNT of the crank counter is not 24 or more at S3300, it ends the process as it is.

When the CPU 31 determines that the reference position signal TDC is low level at S3200, it shifts the process to S3370 to read the logical level of the second cylinder identification signal G2 from the signal processing circuit 43.

It then determines at S3400 whether the logical level G2(n) of the second cylinder identification signal G2 read this time at S3370 coincides with the logical level G2(n−1) of the second cylinder identification signal G2 read previously at S3370 and determines that the logical level G2(n) read this time has changed from the logical level G2(n−1) read previously, i.e., the second cylinder identification signal G2 is reversed, when the both logical levels G2(n) and G2(n−1) do not coincide. It then advances the process to S3450.

It is noted that when the CPU 31 determines that the reference position signal TDC is low level for the first time at S3200 after when the starter signal STA has risen, the CPU 31 handles the previously read level G2(n−1) as the logical level opposite from the level G2(n) read this time at S3400 because no previously read level G2(n−1) of the second cylinder identification signal G2 exists. That is, the CPU 31 determines that the both logical levels G2(n) and G2(n−1) do not coincide.

At S3450, the CPU 31 determines whether or not the logical level G2(n) of the second cylinder identification signal G2 read this time is high level. When it is high level, the CPU 31 initializes the value CNT of the crank counter forcibly to 0 at S3500 and then ends the process. When it determines that the logical level G2(n) is not high level, i.e., low level, at S3450 described above, it shifts the process to S3550 to initialize the value CNT of the crank counter forcibly to 12 and then ends the process.

Meanwhile, when the CPU 31 determines at S3400 that the logical level G2(n) of the second cylinder identification signal G2 read this time at S3370 coincides with the logical level G2(n−1) of the second cylinder identification signal G2 read previously at S3370, it determines that the logical level G2(n) read this time has not changed from the logical level G2(n−1) read previously, i.e., the level of the second cylinder identification signal G2 is not reversed, and advances the process to S3600 to end the process after carrying out correcting process at S3600 through 3700 below to the value CNT of the crank counter.

In the correcting process, the CPU 31 determines whether or not the present value CNT of the crank counter (current value) is 12 or more which is the intermediate value of 0 through 23 at S3600 at first. When the current value is below 12, it sets the value CNT of the crank counter at 12 at S3650 and when the current value is 12 or more, it sets the value CNT of the crank counter at 0 at S3700.

That is, the CPU 31 updates the value CNT of the crank counter under the rule of Table 3 below every time when the 30° CA signal NE2 from the signal processing circuit 43 rises. It is noted that in Table 3, G2(n−1) indicates the logical level of the second cylinder identification signal G2 when the reference position signal TDC has turned to low level previously.

TABLE 3

|  | TDC | G2 (n − 1) | G2(n) | CNT (n − 1) | CNT(n) |  |
|---|---|---|---|---|---|---|
| C3-3 | L | L | H | — | 0 | Initialize |
|  |  | H | L |  | 12 |  |
| C3-4 |  | H −> H |  | <12 | 12 | Correct |
|  |  | L −> L |  | ≧12 | 0 |  |
| C2-2 | H | — | — | ≧0 | +1 | Count up |
| C2-1 |  |  | H | <0 | 8 | Process for starting time |
|  |  |  | L |  | 20 |  |

Specifically, the CPU 31 carries out the following processes.

(1) The CPU 31 reads the logical level of the second cylinder identification signal G2 when the reference position signal TDC from the signal processing circuit 43 is low level. Then, if the logical level G2(n) of the second cylinder identification signal G2 read this time is different from the logical level G2(n−1) of the second cylinder identification signal G2 previously read, the CPU 31 initializes the value CNT of the crank counter forcibly to 0 when G2(n) is high level and forcibly to 12 when G2(n) is low level. It is noted that this operatieon of [C3-3] is realized by the processes of S3200 and S3370 through 3550.

Accordingly, when the second cylinder identification signal G2 changes from low level to high level at the timing when the reference position signal TDC turns to low level, the value CNT of the crank counter is initialized to 0. When the second cylinder identification signal G2 changes from high level to low level, the value CNT of the crank counter is initialized to 12.

It is noted that because 0 and 12 are values different from each other by the value corresponding to one rotation (360° CA) of the crankshaft, the continuity of the value CNT of the crank counter is not hampered by such initialization. That is, the values set by the above initialization (0 and 12) are values which the value CNT of the crank counter assumes even if the above initialization is not executed.

(2) When the reference position signal TDC from the signal processing circuit 43 is low level and the logical level G2(n) of the second cylinder identification signal G2 read this time is the same with the logical level G2(n-1) of the second cylinder identification signal G2 previously read, the CPU 31 determines whether or not the present value CNT of the crank counter (current value) is 12 or more. Then, the CPU 31 carries out a correcting process by setting the value CNT of the crank counter at 12 when the current value is below 12 and by setting the value CNT of the crank counter at 0 when the current value is 12 or more for example. It is noted that this operation is realized by the processes S3200, S3370, S3400 and S3600 through S3700.

Figure 24A:
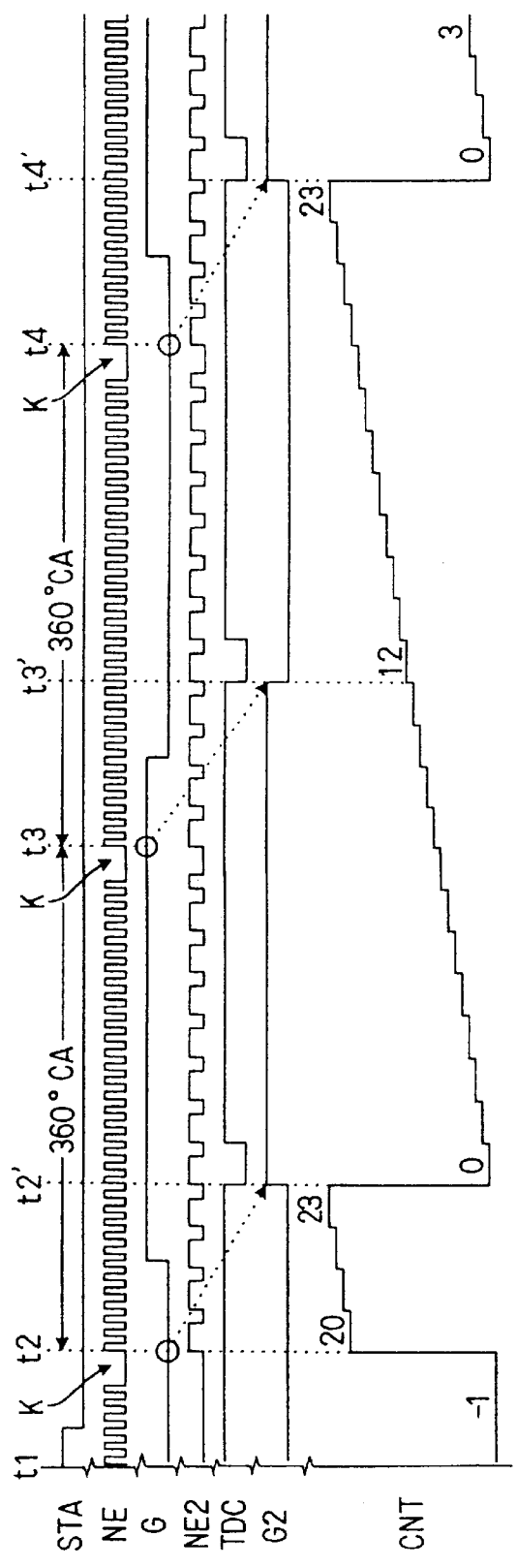
FIGS. 24A and 24B are time charts showing normal cylinder discriminating operations executed in the third through fifth embodiments.
Figure 24B:
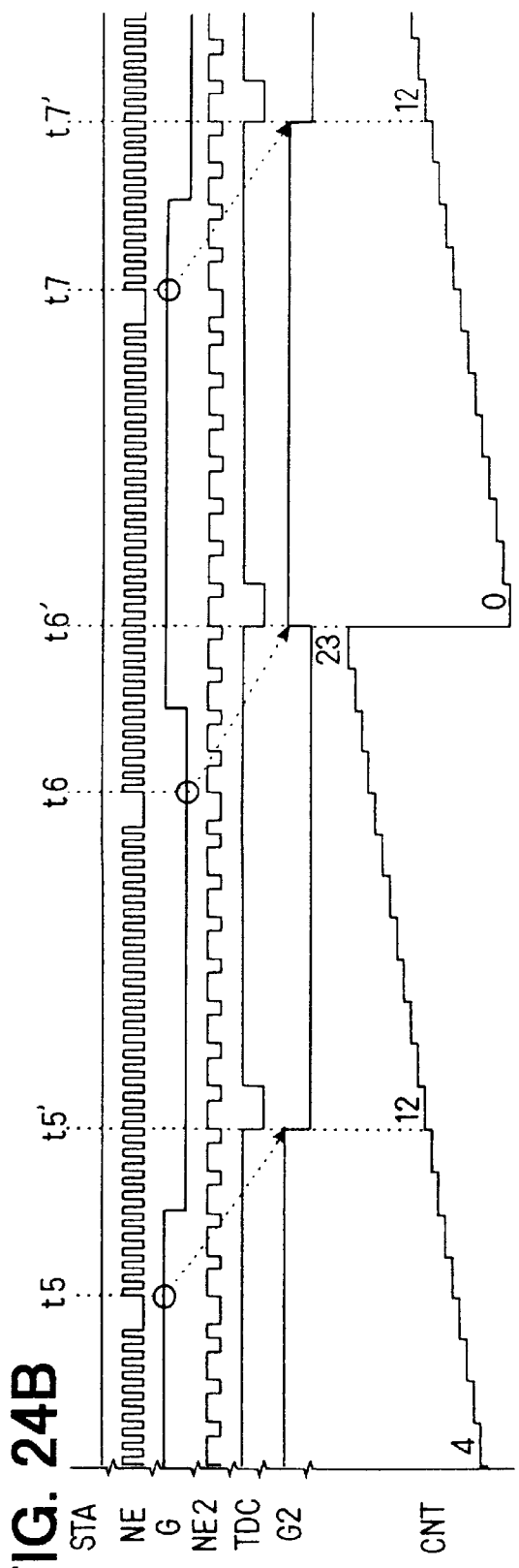

When the cylinder identification signal G inputted from the cam angle sensor 49 to the signal processing circuit 43 is normal and the level of the reference position signal TDC and the second cylinder identification signal G2 from the signal processing circuit 43 to the CPU 31 changes as shown in FIGS. 24A and 24B in the ECU 10 of the third embodiment, the CPU 31 sets the value CNT of the crank counter at 20 by the process at S3100 at time t2 in FIG. 24A and then counts up from 20->21->22 . . . by the process at S3250 every time when the 30° CA signal NE2 from the signal processing circuit rises. Then, when the reference position signal TDC turns to low level at time t2' for the first time, the value CNT of the crank counter is initialized to 0 by the process at S3500.

While the value CNT of the crank counter is counted up by one each by the process at S3250 every time when the 30° CA signal NE2 rises in the period in which the reference position signal TDC is high level, the value CNT of the crank counter is initialized to 12 by the process at S3550 when the reference position signal TDC turns to low and the second cylinder identification signal G2 turns to low at time t3' because the logical level of the second cylinder identification signal G2 at this time turns from high level to low level as compared to the logical level at the time of t2' when the reference position signal TDC has turned to low level previously.

Then, when the reference position signal TDC turns to low and the second cylinder identification signal G2 turns to high at time t4', the value CNT of the crank counter is initialized to 0 by the process at S3500 because the logical level of the second cylinder identification signal G2 at this time has changed from low level to high level as compared to the logical level at the time of t3 when the reference position signal TDC has turned to low level previously.

Thereafter, the value CNT of the crank counter is counted up by one each every time when the 30° CA signal NE2 rises and is initialized to 12 by the process at S3550 at time t5' in FIG. 24B, is initialized to 0 by the process at S3550 at time t6' and is initialized to 12 by the process at S3550 at time t7'.

The value CNT of the crank counter circulates in the range from 0 to 23 by repeating such operations thereafter.

Then, based on the value CNT of the crank counter thus circulated, the CPU 31 discriminates a cylinder to be ignited. For example, the CPU 31 determines as the BTDC 30° CA of the first cylinder when CNT=0, as the BTDC 30° CA of the second cylinder when CNT=4, as the BTDC 30° CA of the third cylinder when CNT=8, as the BTDC 30° CA of the fourth cylinder when CNT=12, as the BTDC 30° CA of the fifth cylinder when CNT=16 and as the BTDC 30° CA of the sixth cylinder when CNT=20.

Although the ECU 10 of the third embodiment allows the control of the engine to be started by discriminating the cylinders from the point of time (time t2 in FIG. 24A) when the missing tooth signal K from the crank angle sensor 47 is detected for the first time, the second cylinder identification signal G2 to the CPU 31 is kept at high level after time t4' by the operation of the signal processing circuit 43 (specifically by the operations at S2220 and S2700 in FIG. 12) when an abnormality occurs in the wire from the cam angle sensor 49 or in the cam angle sensor 49 itself at time tL immediately after time t4 in FIG. 24A for example and the cylinder identification signal G to the signal processing circuit 43 is fixed to low level. Further, when the cylinder identification signal G to the signal processing circuit 43 is fixed at high level at time tH which corresponds to the time immediately after time t5 in FIG. 24B for example, the second cylinder identification signal G2 to the CPU 31 is kept at low level after time t5'.

Then, when the logical level G2(n-1) of the second cylinder identification signal G2 read when the reference position signal TDC has turned to low level previously coincides with the logical level G2(n) of the second cylinder identification signal G2 read when the reference position signal TDC turns to low level this time, the CPU 31 carries out only the correction (S3600 through S3700) to 0 or 12 corresponding to the current value without carrying out the forcible initialization of the value CNT of the crank counter (S3500 or S3550) to 0 or 12 by carrying out the processes at S3400 through 3700 in FIG. 13. In other words, the CPU 31 determines to be normal and initializes the value CNT of the crank counter to 0 or 12 only when the both logical levels G2(n-1) and G2(n) differ from each other.

Figure 15A:
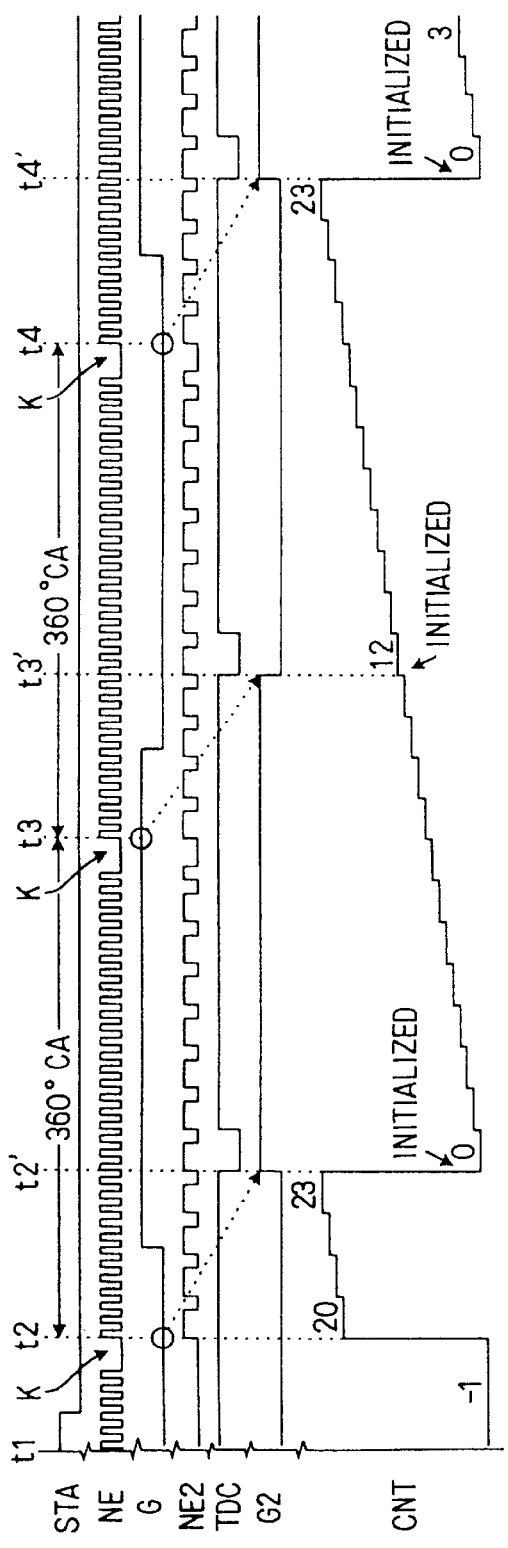
FIGS. 15A and 15B are time charts showing the operation of the third embodiment when the cylinder identification signal G from the cam angle sensor is fixed to high level.
Figure 15B:
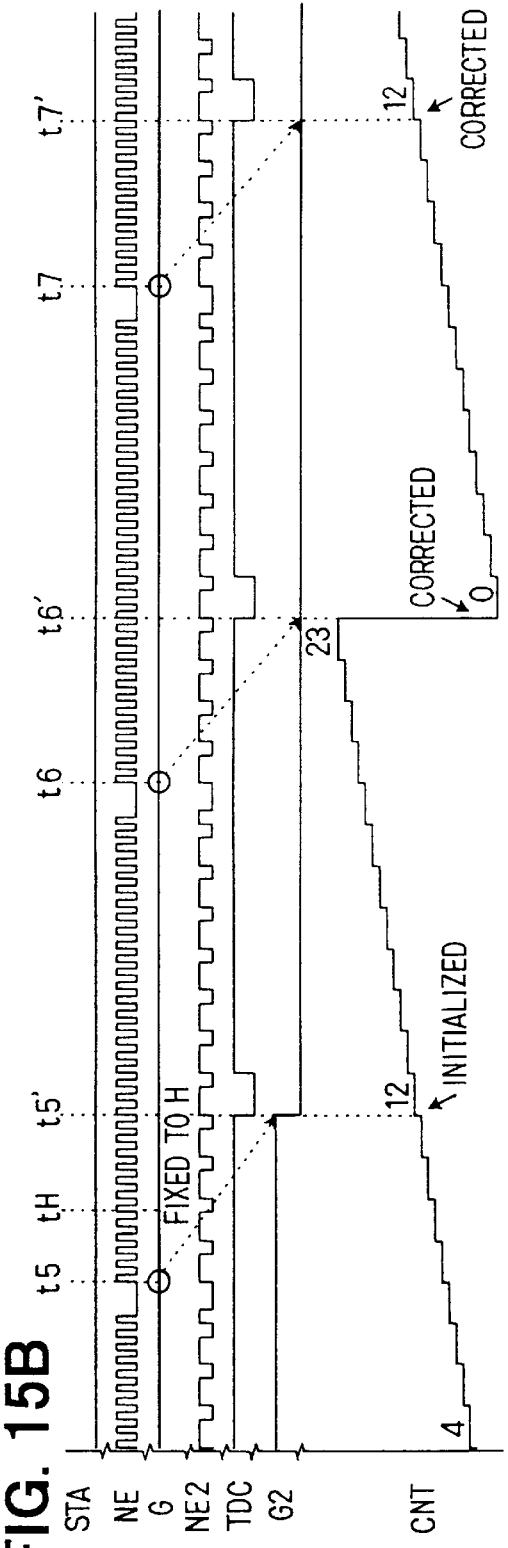

Therefore, the value CNT of the crank counter is not forcibly initialized to 0 and is only corrected to 0 or 12 corresponding to whether the current value at each point of time is 12 or more at times t5', t6' and t7' when the logical level of the second cylinder identification signal G2 turns to high level continuously when the reference position signal TDC has turned to low level as shown in FIGS. 14A and 14B. As a result, the continuity of the value CNT of the crank counter is maintained. Further, the value CNT of the crank counter is not forcibly initialized to 12 and is only corrected to 0 or 12 corresponding to whether the current value at each point of time is 12 or more at times t6' and t7' when the logical level of the second cylinder identification signal G2 turns to low level continuously when the reference position signal TDC has turned to low level as shown in FIGS. 15A and 15B. The continuity of the value CNT of the crank counter is maintained also in this case.

Figure 25A:
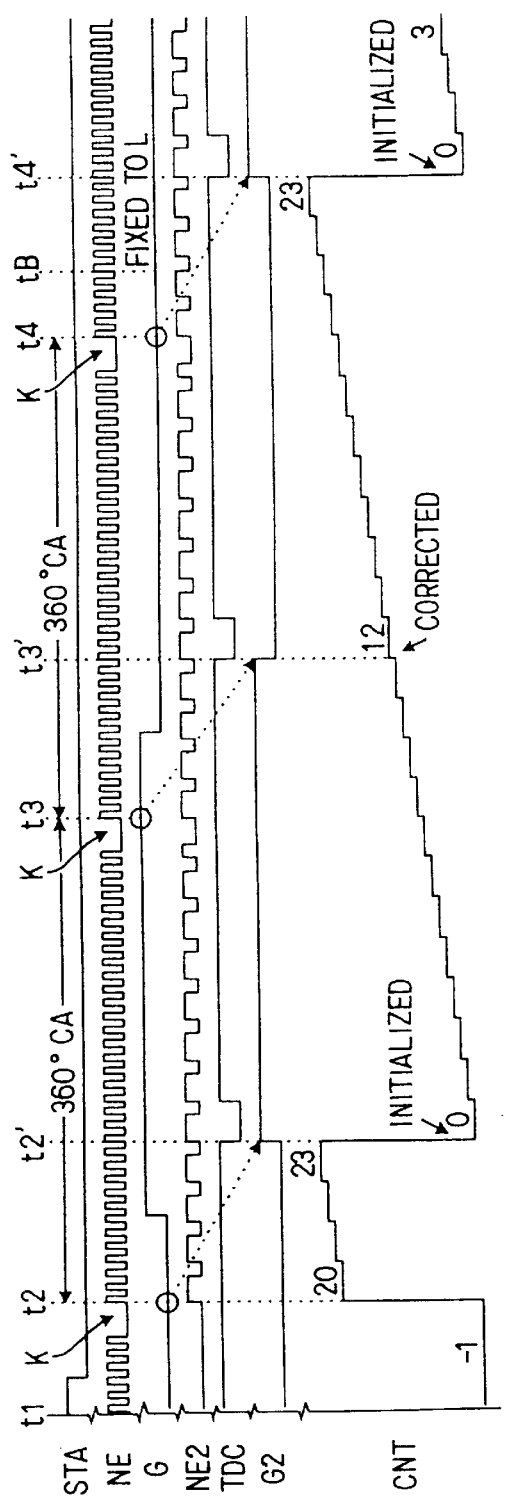
FIGS. 25A and 25B are time charts showing abnormal cylinder discriminating operations executed in the third through fifth embodiments.
Figure 25B:
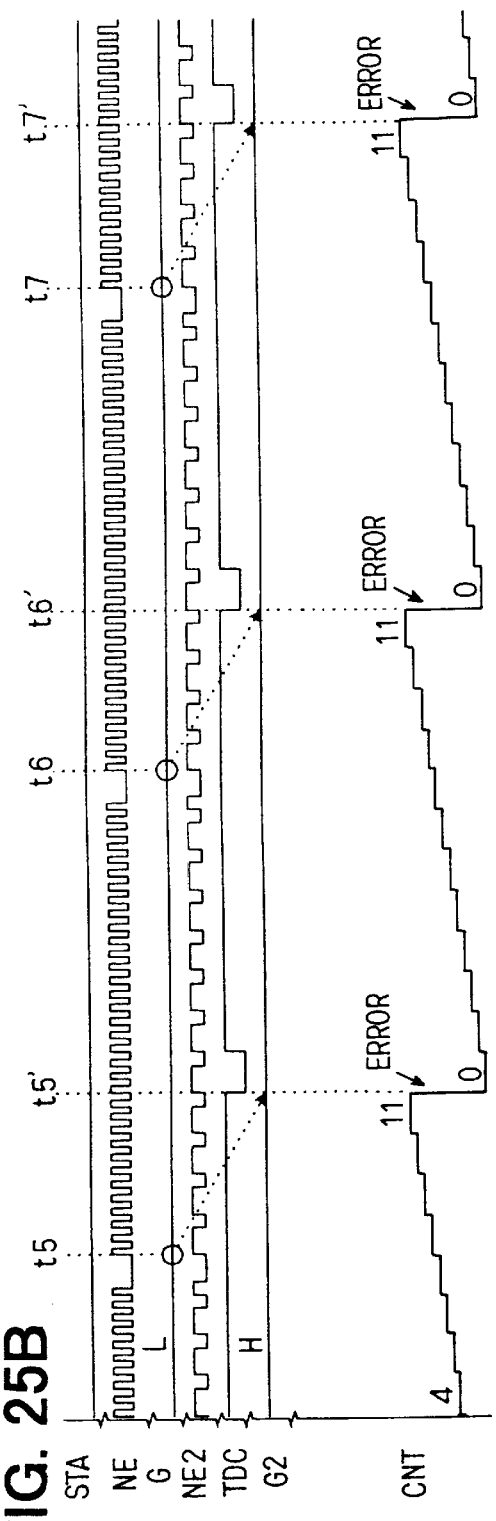

That is, the value CNT of the crank counter is not erroneously initialized as shown in FIGS. 25A and 25B and the CPU 31 can discriminate the cylinders correctly even if an abnormality occurs in the cam angle sensor 49 or in the wire from the cam angle sensor 49.

The processes in FIG. 13 executed by the CPU 31 may be changed as follows in the third embodiment.

(1) When it is determined to be NO at S3450 in FIG. 13, the CPU 31 shifts the process to S3600 without carrying out the process at S3550. Thereby, the value CNT of the crank counter is initialized to 0 when the second cylinder identification signal G2 has changed from low level to high level at the timing when the reference position signal TDC has turned to low level and is corrected to 0 or 12 corresponding to whether the current value at that time is 12 or more in cases other than that.

(2) When it is determined to be YES at S3450 in FIG. 13, the CPU 31 shifts the process to S3600 without carrying out the process at S3500. Thereby, the value CNT of the crank counter is initialized to 12 when the second cylinder identification signal G2 has changed from high level to low level at the timing when the reference position signal TDC has turned to low level and is corrected to 0 or 12 corresponding to whether the current value at that time is 12 or more in cases other than that.

The same effect with the third embodiment described above may be obtained by arranging as described above in the items (1) and (2).

Meanwhile, when the CPU 31 of the third embodiment determines at S3400 that the logical level G2(n) of the second cylinder identification signal G2 read this time coincides with the logical level G2(n-1) of the second cylinder identification signal G2 read previously, it may carry out a certain fail-safe process by determining that an abnormality has occurred in the cam angle sensor 49. Further, a fail-safe process more suitable for abnormal conditions may be realized by providing abnormal mode discriminating means which determines that the cylinder identification signal G from the cam angle sensor 49 is fixed to low level when the logical level G2(n) read this time is high level when it is determined that the both logical levels G2(n) and G2(n-1) coincide and which determines that the cylinder identification signal G from the cam angle sensor 49 is fixed to high level when the logical level G2(n) read this time is fixed to low level.

(Fourth Embodiment)

In a fourth embodiment, shown in FIGS. 16 through 19A and 19B, the ECU 10 is constructed to differ from that of the third embodiment only in the following points (1) and (2).

Figure 16:
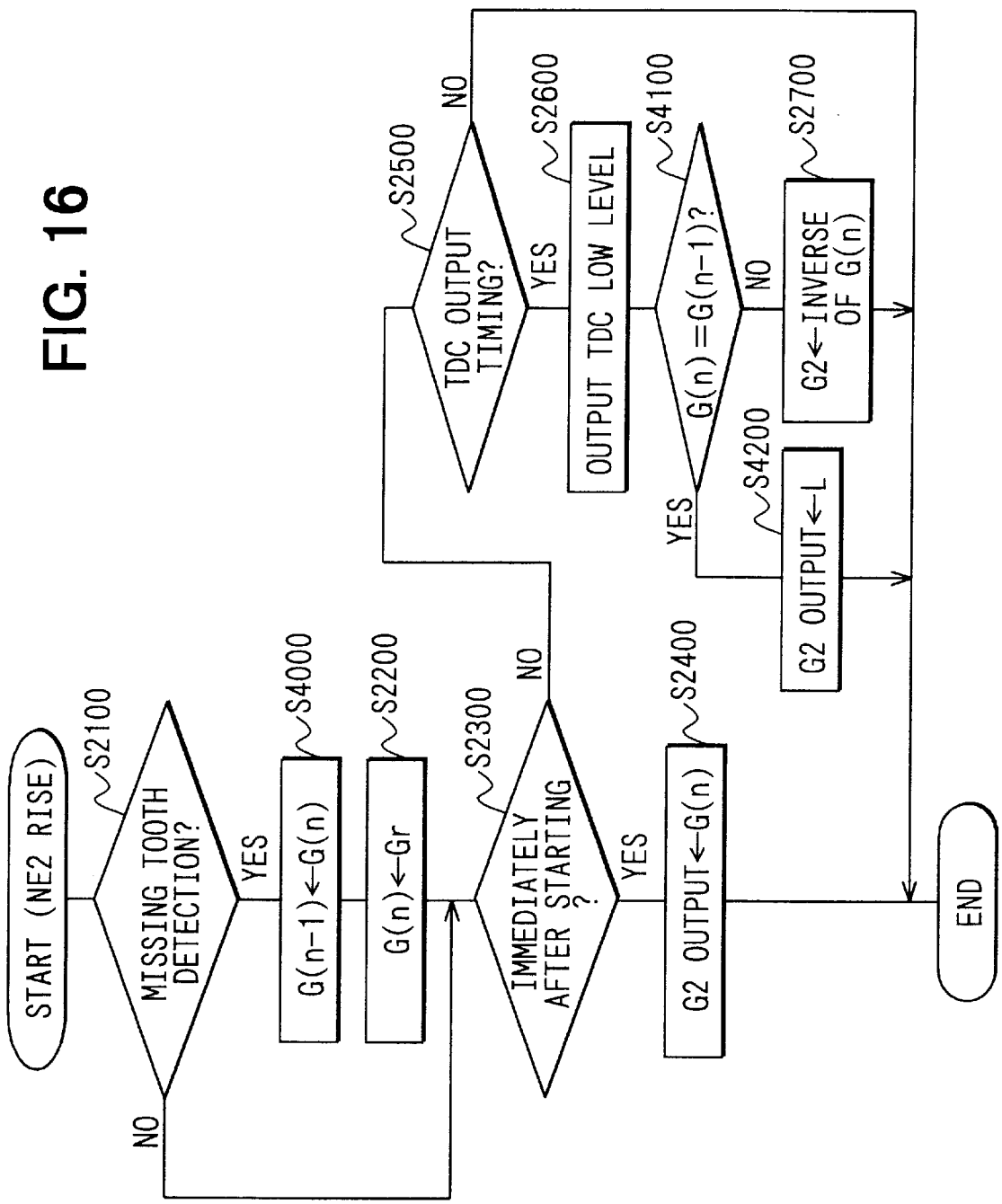
FIG. 16 is a flow chart showing the operation of a identification signal generating circuit in a signal processing circuit of an engine control apparatus according to a fourth embodiment of the invention.

(1) The identification signal generating circuit 690 of the signal processing circuit 43 carries out the process in FIG. 16 every rising timing of the 30° CA signal NE2 generated by the 30° CA signal generating circuit 67. It is noted that the identification signal generating circuit 690 initially sets the reference position signal TDC to high level when the starter signal STA rises and initially sets the second cylinder identification signal G2 to low level also in the fourth embodiment. In FIG. 16, G(n) is 1-bit storage section for storing the latest read level Gr of the cylinder identification signal G read this time by the level reading circuit 65 and G(n-1) is 1-bit storage section for storing the read level Gr of the cylinder identification signal G read previously by the level reading circuit 65.

The process in FIG. 16 executed by the identification signal generating circuit 690 is different from the process in FIG. 13 only in the following points (1-1) and (1-2).

(1-1) A process at S4000 is added between S2100 and S2200.

When the identification signal generating circuit 690 discriminates the missing tooth detecting timing at S2100, it stores the logical level within G(n) to G(n-1) at S4000 and then stores the read level Gr of the cylinder identification signal G read this time by the level reading circuit 65 to G(n) at S2200.

However, because there exists no previously read level Gr of the cylinder identification signal G when the missing tooth detecting timing is discriminated for the first time (time t2) at S2100 after when the starter signal STA has risen, the identification signal generating circuit 690 stores the logical level opposite from that of the read level Gr read this time by the level reading circuit 65 in G(n-1) at S4000.

(1-2) A process at S4100 is added between S2600 and S2700 and a process at S4200 which is executed in response to the discrimination result at S4100 is also added.

When the identification signal generating circuit 690 discriminates the TDC output timing at S2500 and turns the reference position signal TDC to low level at S2600, it advances the process to S4100 to determine whether or not the logical level within G(n) coincides with the logical level within G(n-1). When the both logical levels do not coincide each other, the identification signal generating circuit 690 advances the process to S2700 to set the output level of the second cylinder identification signal G2 at the level opposite from the logical level within G(n), i.e., at the read level Gr of this time, and then ends the process.

On the contrary, when it is discriminated that the logical level within G(n) coincides with the logical level within G(n-1) at S4100, the identification signal generating circuit 690 determines that the logical level of the cylinder identification signal G read this time by the level reading circuit 65 has not changed from the logical level of the cylinder identification signal G read previously by the level reading circuit 65, i.e., to be abnormal, and shifts the process to S4200. Then, the identification signal generating circuit 690 sets the output level of the second cylinder identification signal G2 to low level regardless of the logical level within G(n) and then ends the process.

Figure 17:
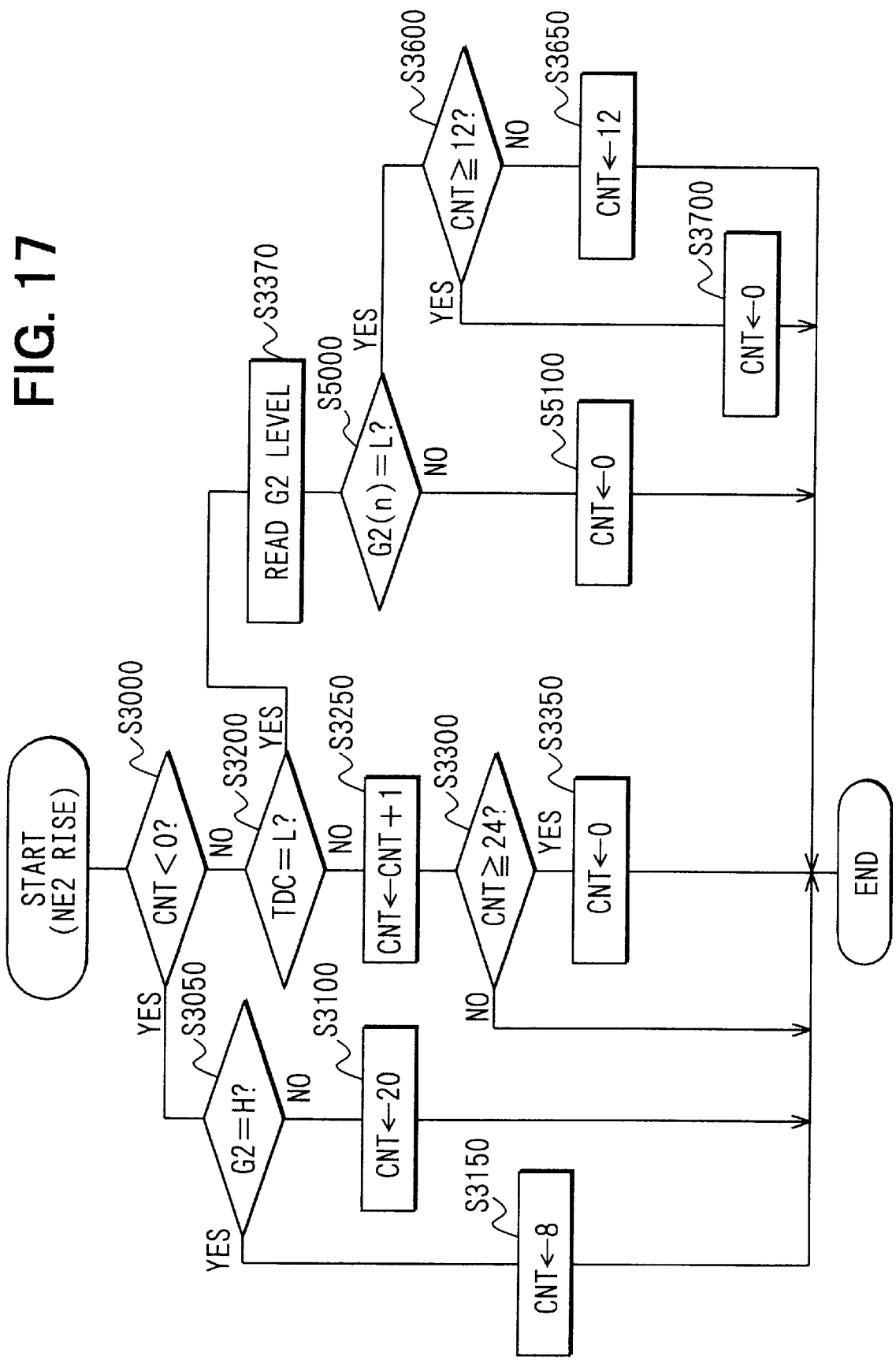
FIG. 17 is a flowchart showing the processes executed by a CPU of the fourth embodiment.

(2) Next, the CPU 31 carries out processes in FIG. 17 instead of the processes in FIG. 13 described before every time when the 30° CA signal NE2 from the signal processing circuit 43 rises.

As compared to the processes in FIG. 13, the CPU 31 carries out processes at S5000 and S5100 instead of the processes at S3400 through S3550 in the processes of the fourth embodiment in FIG. 17.

That is, when the CPU 31 reads the logical level of the second cylinder identification signal G2 from the signal processing circuit 43 at S3370, it advances to the process at S5000 to discriminate whether or not the logical level G2(n) of the second cylinder identification signal G2 read this time at S3370 is low level. When it is low level, the CPU 31 carries out the correcting process at S3600 through S3700. However, when the CPU 31 discriminates that the logical level G2(n) read this time at S3370 is not low level, i.e., high level, at S5000, it shifts the process to S5100 to initialize the value CNT of the crank counter forcibly to 0 and then ends the process.

Therefore, the CPU 31 of the fourth embodiment forcibly initializes the value CNT of the crank counter to 0 only when the reference position signal TDC from the signal processing circuit 43 is low level and the second cylinder identification signal G2 is high level as specific level (YES at S3200 and NO at S5000). That is, the CPU 31 updates the value CNT of the crank counter every time when the 30° CA signal NE2 from the signal processing circuit 43 rises.

Figure 20:
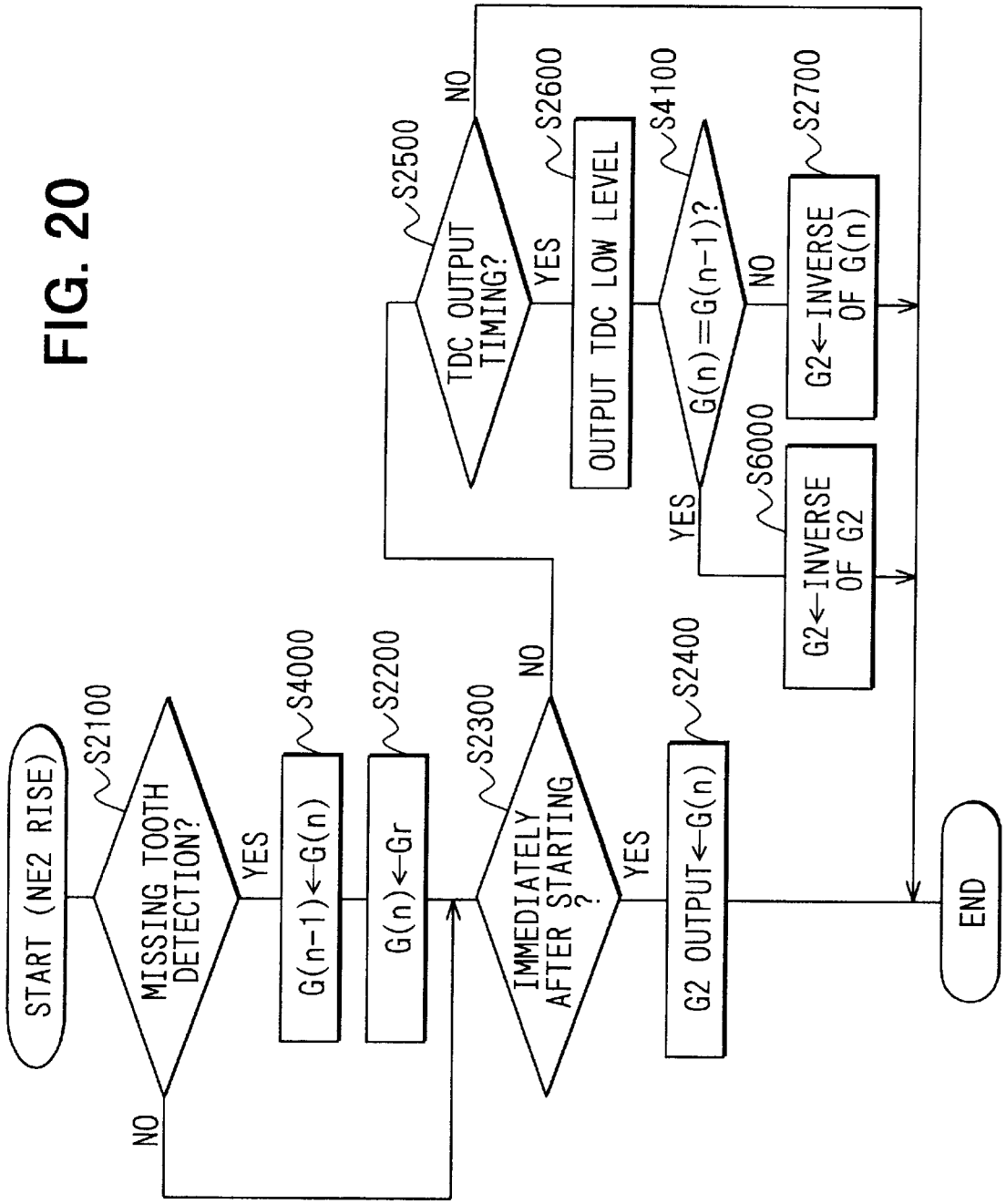
FIG. 20 is a flow chart showing the operation of a identification signal generating circuit in a signal processing circuit of an engine control apparatus according to a fifth embodiment of the invention.

When the cylinder identification signal G inputted from the cam angle sensor 49 to the signal processing circuit 43 is normal and the cylinder identification signal G, the starter signal STA and the crank rotation signal NE from the crank angle sensor 47 change in the temporal relationship as shown in FIG. 20 in such ECU 10 of the present embodiment, the reference position signal TDC and the second cylinder identification signal G2 are outputted from the signal processing circuit 43 to the CPU 31 in the same procedure as explained with reference to FIGS. 24A and 24B. Then, the value CNT of the crank counter is circulated within the range of 0 through 23 also in the CPU 31 in the same manner as explained with reference to FIGS. 24A and 24B.

Therefore, when the second cylinder identification signal G2 from the signal processing circuit 43 is fixed to high level as explained with reference to FIGS. 25A and 25B, the CPU 31 is unable to discriminate the cylinders correctly because the value CNT of the crank counter is erroneously initialized to 0 per 360° CA when the reference position signal TDC from the signal processing circuit 43 turns to low level.

According to the fourth embodiment, the signal processing circuit 43 determines whether the logical level of the cylinder identification signal G read this time at the timing when the missing tooth signal K has occurred has changed from the logical level of the cylinder identification signal G read previously. When it determines that no change has been made (YES at S4100), the output level of the second cylinder identification signal G2 to the CPU 31 is fixed to low level opposite from high level by the process at S4200 in FIG. 16.

Therefore, when an abnormality occurs in the wire from the cam angle sensor 49 or in the cam angle sensor 49 itself and the cylinder identification signal G is fixed to low level at time tL which corresponds to the time immediately after time t4 in FIGS. 24A and 24B for example, the signal processing circuit 43 fixes the second cylinder identification signal G2 to the CPU 31 to low level regardless of the logical level of the cylinder identification signal G after time t5' which is the TDC output timing in the case when the logical level of the cylinder identification signal G when the missing tooth signal K is generated turns to the same level continuously (low level in this example).

Therefore, the value CNT of the crank counter is not initialized forcibly to 0 as shown in FIGS. 25A and 25B after time t5' in FIGS. 18A and 18B in the CPU 31 and merely the reference position signal TDC is corrected to 0 or 12 corresponding to the current value at each moment when the reference position signal TDC has turned to low level. As a result, the continuity of the value CNT of the crank counter may be maintained.

Further, as shown in FIGS. 19A and 19B, even when an abnormality occurs in the wire from the cam angle sensor 49 or in the cam angle sensor 49 itself and the cylinder identification signal G is fixed to high level at time tH which corresponds to the time immediately after time t5 in FIGS. 24A and 24B for example, the signal processing circuit 43 fixes the second cylinder identification signal G2 to the CPU 31 to low level regardless of the logical level of the cylinder identification signal G after time t6' which is the TDC output timing in the case when the logical level of the cylinder identification signal G when the missing tooth signal K is generated turns to the same level continuously (high level in this example). Then, the value CNT of the crank counter is not initialized forcibly to 0 in the CPU 31 and the continuity of the value CNT of the crank counter may be maintained.

From the above, even when an abnormality occurs in the cam angle sensor 49 or in the wire from the cam angle sensor 49 and the logical level of the cylinder identification signal G to the signal processing circuit 43 is fixed, the CPU 31 can circulate the value CNT of the crank counter continuously in the range from 0 to 23 and the cylinders may be discriminated correctly also by the fourth embodiment.

(Fifth Embodiment)

In a fifth embodiment, shown in FIGS. 20 to 23A and 23B, the ECU 10 is constructed to differ from the fourth embodiment only in the following points (1) and (2).

(1) The identification signal generating circuit 690 of the signal processing circuit 43 carries out processes in FIG. 20 instead of the processes in FIG. 16 described above per every rising timing of the 30° CA signal NE2 generated by the 30° CA signal generating circuit 67. It is noted that the identification signal generating circuit 690 initially sets the reference position signal TDC to high level and initially sets the second cylinder identification signal G2 to low level when the starter signal STA rises also in the fifth embodiment. G(n) and G(n–1) in FIG. 20 are storage sections described with reference to FIG. 16.

AS compared to the processes in FIG. 16, a process at S6000 is executed instead of the process at S4200 in the processes in FIG. 20. That is, when the identification signal generating circuit 690 in the signal processing circuit 43 determines that the logical level within G(n) coincides with the logical level within G(n–1) at S4100, it shifts the process to S6000 to reverse the output level of the second cylinder identification signal G2 regardless of the logical level within G(n) and then ends the process.

Therefore, although the signal processing circuit 43 of the fifth embodiment determines whether or not the logical level of the cylinder identification signal G read this time at the timing when the missing tooth signal K is generated has changed from the logical level of the cylinder identification signal G previously read by the processes at S4000, S2220 and S4100 in the same manner with the fourth embodiment. When the signal processing circuit 43 determines that there is no change (YES at S4100), it sets the output level of the second cylinder identification signal G2 to the CPU 31 to the level opposite from the previous output level regardless of the logical level of the cylinder identification signal G read this time by the process at S6000.

Figure 21:
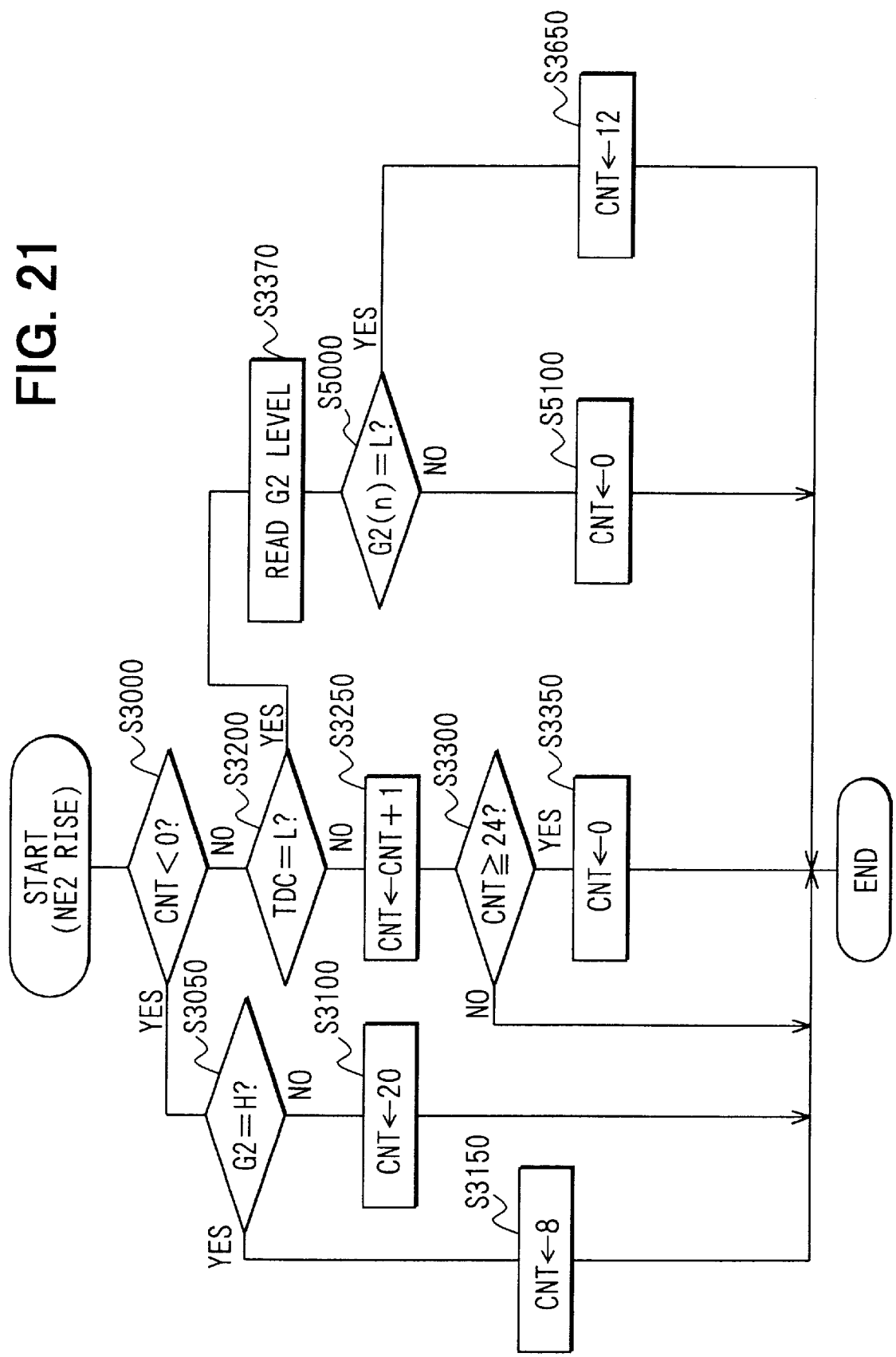
FIG. 21 is a flowchart showing the processes executed by a CPU of the fifth embodiment.

(2) The the CPU 31 carries out processes in FIG. 21 instead of the processes in FIG. 17 described above every time when the 30° CA signal NE2 from the signal processing circuit 43 rises.

As compared to the processes in FIG. 17, the processes at S3600 and 3700 are deleted in the processes in FIG. 21.

Specifically, when the CPU 31 determines at S5000 that the logical level G2(n) of the second cylinder identification signal G2 read this time at S3370 is low level, it shifts the process to S3650 to set the value CNT of the crank counter at 12 regardless of the current value at that time.

That is, the CPU 31 of the fifth embodiment initializes the value CNT of the crank counter forcibly to 0 when the second cylinder identification signal G2 is high level when the reference position signal TDC from the signal processing circuit 43 turns to low level as shown in the column of "Initialize" in the following Table 4 (NO at S5000, S5100) or forcibly initializes the value CNT of the crank counter to 12 when the second cylinder identification signal G2 is low level (YES at S5000, S3650).

TABLE 4

| TDC | G2(n) | CNT (n − 1) | CNT(n) | |
|---|---|---|---|---|
| L | H | — | 0 | Initialize |
|   | L | — | 12 | |
| H | — | ≧0 | +1 | Count up |
|   | H | <0 | 8 | Process for |
|   | L |   | 20 | starting time |

When the cylinder identification signal G inputted from the cam angle sensor 49 to the signal processing circuit 43 is normal and the cylinder identification signal G, the starter signal STA and the crank rotation signal NE from the crank angle sensor 47 change in the temporal relationship as shown in FIGS. 24A and 24B in the ECU 10 of the fifth embodiment, the reference position signal TDC and the second cylinder identification signal G2 are outputted from the signal processing circuit 43 to the CPU 31 in the same procedure with what explained in FIGS. 24A and 24B.

In this case, the value CNT of the crank counter is updated from −1->20->21->22->23->0 until time t2' in FIGS. 24A and 24B in the CPU 31.

Then, the value CNT of the crank counter is counted up thereafter by one each during the period in which the reference position signal TDC is high level every time when the 30° CA signal NE2 rises. It is also initialized forcibly to 12 when the reference position signal TDC turns to low and the second cylinder identification signal G2 turns to low (time t3', t5' and t7' in FIGS. 24A and 24B) and is initialized forcibly to 0 when the reference position signal TDC turns to low and the second cylinder identification signal G2 turns to high (time t4' and t' in FIGS. 24A and 24B).

Due to that, the value CNT of the crank counter circulates repeatedly within the range of 0 to 23 as shown in FIGS. 24A and 24B during the normal time in the same manner with the prior art apparatus and with the respective embodiments described above.

Meanwhile, when the cylinder identification signal G is fixed to low level as an abnormality occurs in the wire from the cam angle sensor 49 or in the cam angle sensor 49 itself at time tL which corresponds to the time immediately after t4 in FIG. 20 for example in the ECU of the fifth embodiment, the signal processing circuit 43 forcibly reverses the level of the second cylinder identification signal G2 to the CPU 31 regardless of the logical level of the cylinder identification signal G every time when the TDC output timing comes (time t5', t6' and t7') on and after t5 when the logical level of the cylinder identification signal G becomes the same level (low level in this case) continuously for the first time when the missing tooth signal K is generated.

Therefore, the value CNT of the crank counter is circulated within the range of 0 to 23 even on and after t5' in FIGS. 18A and 18B in the CPU 31 totally in the same manner with the normal time.

Further, even if an abnormality occurs in the wire from the cam angle sensor 49 or in the cam angle sensor 49 itself at time tH which corresponds to the time immediately after t5 in FIGS. 24A and 24B for example and the cylinder identification signal G is fixed to high level, the signal processing circuit 43 forcibly reverses the level of the second cylinder identification signal G2 to the CPU 31 every time when the TDC output timing comes (time t6' and t7') regardless of the logical level of the cylinder identification signal G on after time t6 when the logical level of the cylinder identification signal G becomes the same level (high level in this case) continuously when the missing tooth signal K is generated as shown in FIGS. 23A and 23B. Therefore, the value CNT of the crank counter is circulated in the range from 0 to 23 in the CPU 31 totally in the same manner with the normal time also in this case.

Accordingly, even if an abnormality occurs in the cam angle sensor 49 or in the wire from the cam angle sensor 49 and the logical level of the cylinder identification signal G to the signal processing circuit 43 is fixed, the ECU 10 of the fifth embodiment also allows the cylinders to be discriminated correctly by circulating the value CNT of the crank counter continuously within the range from 0 to 23 on the CPU 31 side.

Further, the use of the signal processing circuit 43 of the fifth embodiment allows the process in the CPU 31 for discriminating the cylinders to be simplified because the CPU 31 can update the value CNT of the crank counter with the simple rule as shown in Table 4 described above. It is apparent when FIG. 21 is compared with FIG. 13 or FIG. 17.

That is, the CPU 31 can circulate the value CNT of the crank counter normally within the range from 0 to 23 while preventing the value CNT of the crank counter from deviating from the normal value due to noise or the like just by carrying out the simple process of initializing the value CNT of the crank counter to 0 when G2=High or to 12 when G2=Low corresponding to the logical level of the second cylinder identification signal G2 at the time every time when the reference position signal TDC turns to low level, i.e., every time when the level of the second cylinder identification signal G2 is reversed.

It is also possible to arrange the ECU 10 of the fifth embodiment such that the CPU 31 carries out the processes in FIG. 17 similarly to the case of the fourth embodiment.

Meanwhile, it is also possible to arrange the fifth embodiment such that the signal processing circuit 43 only detects the TDC output timing (the timing when the rotational position of the crankshaft comes to the reference position described before) internally and outputs no reference position signal TDC.

In this case, the CPU 31 carries out the following process instead of discriminating whether or not the reference position signal TDC is low level at S3200 in FIG. 12.

That is, the CPU 31 reads the logical level of the second cylinder identification signal G2 and discriminates whether or not the previous read level is the same with the read level of this time at S3200. When the previous read level is the same with the read level of this time, the CPU 31 advances the process to S3250 and when they are different, it determines that the level of the second cylinder identification signal G2 is reversed and shifts the process to S5000. In this case, the process at S3370 becomes unnecessary. The CPU 31 discriminates whether or not the logical level G2(n) of the second cylinder identification signal G2 read this time at S3200 after the change is low level at S5000.

While the preferred embodiments of the invention have been described above, it is needless to say that the present invention may be modified in various ways.

For instance, although the signal processing circuit 43 has discriminated whether or not the logical level of the cylinder identification signal G read this time (hereinafter referred to as the G level of this time) has changed from the logical level of the cylinder identification signal G previously read (hereinafter referred to as the previous G level) by directly comparing the logical level of the cylinder identification signal G read this time in detecting the missing tooth (in detecting the missing tooth signal K) with the logical level of the cylinder identification signal G read previously in detecting the missing tooth in the fourth and fifth embodiments described above, it may be arranged in the following manners.

That is, it may be arranged so as to monitor the logical level of the cylinder identification signal G whether it has been reversed during the period from when the missing tooth signal K within the crank rotation signal NE has been detected previously till when it is detected this time, to determine that the G level of this time has changed from the previous G level when the level has been reversed or to determine that the G level of this time has not changed from the previous G level when the logical level of the cylinder identification signal G has not been reversed even once.

In such a case, it is more preferable to arrange so as to count the total number of reversal of "reversal from L to H" and "reversal from H to L" of the cylinder identification signal G during the period from when the missing tooth signal K has been detected previously till when it is detected this time, to determine that the G level of this time has changed from the previous G level when the total number of reversal is an odd number and to determine that the G level of this time has not changed from the previous G level when it is an even number.

It is noted that monitoring whether or not the logical level of the cylinder identification signal G has been reversed may be executed by monitoring whether or not a level reversing edge has occurred in the cylinder identification signal G.

Further, although the case in which the period from when the missing tooth signal K is generated till when the reference position signal TDC turns to active level is a period corresponding to 120° CA has been exemplified in each embodiment described above, that period may be a period corresponding to a crank angle other than 120° CA.

Still more, the case when the engine to be controlled is the six-cylinder engine has been exemplified in each embodiment described above, the invention is not limited to such case and the engine to be controlled may be a four-cylinder engine or an eight-cylinder engine for example.

Meanwhile, although the level of the cylinder identification signal G outputted from the cam angle sensor 49 has been reversed once per every 360° CA in each embodiment described above, the cylinder identification signal G may be a signal whose logical level is different alternately per each timing when the missing tooth signal K is outputted from the crank angle sensor 49And may be a signal whose level is reversed by a plurality of times during the period when the pulse signals are outputted from the crank angle sensor 47.

It is also possible to arrange the signal processing circuit 43 so that the level reading circuit 65 reads the logical level of the cylinder identification signal G at the timing when the crank rotation signal NE rises for the first time since when the missing tooth detecting signal FK from the missing tooth detecting circuit 63 has risen, i.e., at time tb in FIG. 2.

Still more, although each embodiment described above has been explained such that each section of the signal processing circuit 43 operates from the first time starting from the time when the starter switch is turned on, it is possible to arrange the signal processing circuit 43 so as to operate from the first time starting from the time when another factor occurs, e.g., in resetting power on or in detecting that the engine speed is zero.

Further, although the value CNT of the crank counter has been counted up in each embodiment described above, the value CNT of the crank counter may be counted down. The range in which the value CNT of the crank counter is circulated is not also limited to 0 to 23. It may be set appropriately from 5 to 28 or from 10 to 33 for example.

The present invention should not be limited to the above embodiments but may be implemented in various other ways without departing from the spirit of the invention.

What is claimed is:

1. An engine control apparatus comprising:

first signal generating means for generating a reference position signal at a predetermined reference position of a crankshaft and rotation signals at every predetermined rotation of the crankshaft;

second signal generating means for generating a logical signal in response to a rotation of a shaft rotated at a rate of 1/2 of rotation of the crankshaft, the logical signal changes a logical level thereof alternately at timing of the reference position signal;

level reading means for reading the logical level of the logical signal in response to the reference position signal;

counting means for counting accumulated angle of rotation of the crankshaft during two rotations of the crankshaft using the rotation signals of the first signal generating means;

initializing means for initializing a count of the counting means to a first value and a second value when the output level read by the level reading mean is high and low, respectively; and inhibiting means for inhibiting an operation of the initializing means when the logical level read this time by level reading means coincides with the logical level read previously by the level reading means.

2. The engine control apparatus as in claim 1, wherein:

the first value and the second value are differentiated from each other by an amount corresponding to one rotation of the crankshaft thereby to maintain a continuity of the count of the counting means.

3. An engine control apparatus comprising:

first signal generating means for generating a reference position signal at a predetermined reference position of a crankshaft and rotation signals at every predetermined rotation of the crankshaft;

second signal generating means for generating a logical signal in response to a rotation of a shaft rotated at a rate of 1/2 of rotation of the crankshaft, the logical signal changes a logical level thereof alternately at timing of the reference position signal;

level reading means for reading the logical level of the logical signal in response to the reference position signal;

counting means for counting accumulated angle of rotation of the crankshaft during two rotations of the crankshaft using the rotation signals of the first signal generating means;

initializing means for initializing a count of the counting means to a first value and a second value when the output level read by the level reading mean is high and low, respectively; and inhibiting means for inhibiting an operation of the initializing means when the logical level of the logical signal has not been reversed even once by checking whether the logical level has been reversed during a period from when the logical level has been read previously by the level reading means till when it is read this time.

4. The engine control apparatus as in claim 3, wherein:

the first value and the second value are differentiated from each other by an amount corresponding to one rotation of the crankshaft thereby to maintain a continuity of the count of the counting means.

5. An engine control apparatus comprising:

a signal processing unit for generating first rotation signals at every predetermined rotation of a crankshaft such that the rotation signals include a first reference position signal at a predetermined reference position of the crankshaft, and a first cylinder identification signal which alternately changes logical levels thereof at a timing of the first reference position signal;

the signal processing unit for reading the first cylinder discrimination signal at the timing of the first reference position signal of the first rotation signals and for generating second rotation signals, a second reference position signal and a second cylinder identification signal at a timing of the second reference position signal;

a microcomputer for controlling an engine based on outputs of the signal processing unit; and the microcomputer including updating means for updating a count value thereof in response to each of the second rotation signals, and level reading means for reading a logical level of the second reference position signal each time the second reference position signal becomes an active level, wherein the microcomputer includes initialization control means that discriminates whether or not the logical level read this time has changed from the logical level read previously, and initializes forcibly the count value to a predetermined value corresponding to the logical level read this time when the logical level read this time has changed.

6. An engine control apparatus comprising:

a signal processing unit for generating first rotation signals at every predetermined rotation of a crankshaft such that the rotation signals include a first reference position signal at a predetermined reference position of the crankshaft, and a first cylinder identification signal which alternately changes logical levels thereof at a timing of the first reference position signal;

the signal processing unit for generating, from the first rotation signals and the first cylinder identification signal, second rotation signals, a second reference position signal and a second cylinder identification signal synchronized with the second reference position signal;

a microcomputer for controlling an engine based on outputs of the signal processing unit; and the microcomputer including updating means for updating a count value thereof in response to each of the second rotation signals, and initializing means for reading a logical level of the second reference position signal to discriminate whether the logical level of the second reference position signal is at a predetermined level each time the second reference position signal becomes an active level and initializing forcibly the count value to a predetermined value when the logical level read is at the predetermined level, wherein the signal processing unit includes level reading means for reading the first cylinder identification signal at a timing of reference position of the first rotation signals, and fixing means for discriminating whether or not a logical level of the first rotation signals read this time has changed from a logical level of the first rotation signals read previously and fixing an output level of the second cylinder identification signal to a level opposite the predetermined level when the logical level read this time has not changed.

7. An engine control apparatus comprising:

a signal processing unit for generating first rotation signals at every predetermined rotation of a crankshaft such that the rotation signals include a first reference position signal at a predetermined reference position of the crankshaft, and a first cylinder identification signal which alternately changes logical levels thereof at a timing of the first reference position signal;

the signal processing unit for generating, from the first rotation signals and the first cylinder identification signal, second rotation signals, a second reference position signal and a second cylinder identification signal synchronized with the second reference position signal;

a microcomputer for controlling an engine based on outputs of the signal processing unit; and the microcomputer including updating means for updating a count value thereof in response to each of the second rotation signals, and initializing means for reading a logical level of the second reference position signal to discriminate whether the logical level of the second reference position signal is at a predetermined level each time the second reference position signal becomes an active level and initializing forcibly the count value to a predetermined value when the logical level read is at the predetermined level, wherein the signal processing unit includes level reading means for reading the first cylinder identification signal at a timing of reference position of the first rotation signals, and output means for discriminating whether or not a logical level of the first rotation signals read this time has changed from a logical level of the first rotation signals read previously and outputting, as the second cylinder identification signal of this time, an output level opposite an output level of the second cylinder identification signal outputted previously when the logical level read this time has not changed.

* * * * *

UNITED STATES PATENT AND TRADEMARK OFFICE
CERTIFICATE OF CORRECTION

PATENT NO.    : 6,341,253 B1
DATED         : January 22, 2002
INVENTOR(S)   : Honda It is certified that error appears in the above-identified patent and that said Letters Patent is hereby corrected as shown below:

<u>Title page,</u>
Item [30], change priority number "12-026405" to -- 2000-026405 --.

Signed and Sealed this

Seventh Day of May, 2002

Attest:

Attesting Officer

JAMES E. ROGAN
*Director of the United States Patent and Trademark Office*